(12) United States Patent
Guo

(10) Patent No.: US 10,506,587 B2
(45) Date of Patent: Dec. 10, 2019

(54) METHOD AND APPARATUS FOR BEAM INDICATION IN NEXT GENERATION WIRELESS SYSTEMS

(71) Applicant: Samsung Electronics Co., Ltd., Gyeonggi-do (KR)

(72) Inventor: Li Guo, Allen, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/982,938

(22) Filed: May 17, 2018

(65) Prior Publication Data

US 2018/0343653 A1    Nov. 29, 2018

Related U.S. Application Data

(60) Provisional application No. 62/597,791, filed on Dec. 12, 2017, provisional application No. 62/588,586, (Continued)

(51) Int. Cl.
*H04W 72/04* (2009.01)
*H04W 4/70* (2018.01)
(Continued)

(52) U.S. Cl.
CPC ........ *H04W 72/0446* (2013.01); *H04B 7/088* (2013.01); *H04L 5/0053* (2013.01); *H04W 4/70* (2018.02); *H04W 16/28* (2013.01); *H04W 72/042* (2013.01); *H04W 72/046* (2013.01); *H04W 72/085* (2013.01); *H04W 72/1273* (2013.01); *H04L 5/0023* (2013.01); *H04L 5/0035* (2013.01); *H04L 5/0051* (2013.01)

(58) Field of Classification Search
CPC ... H04W 72/0446; H04W 4/70; H04W 16/28; H04W 72/042; H04W 72/046; H04W 72/085; H04W 72/1273; H04L 5/0053; H04B 7/088
See application file for complete search history.

(56) References Cited

U.S. PATENT DOCUMENTS

2015/0263829 A1    9/2015  Nguyen et al.
2018/0235008 A1    8/2018  Park et al.

FOREIGN PATENT DOCUMENTS

WO    2017023231 A1    2/2017
WO    2017026813 A1    2/2017

OTHER PUBLICATIONS

International Search Report and Written Opinion regarding International Application No. PCT/KR2018/005979, dated Sep. 12, 2018, 10 pages.

(Continued)

*Primary Examiner* — Ronald B Abelson

(57) ABSTRACT

A method of a user equipment (UE) for a beam indication in a wireless communication system is provided. The method includes receiving, from a base station (BS), downlink control information (DCI) including scheduling information for a data transmission on a downlink data channel, wherein the DCI includes an index of a spatial quasi-co-location (QCL) configuration, comparing a time offset between the data transmission and the DCI with a threshold that is pre-configured at the UE, and calculating a receive (Rx) beam based on the index of the spatial QCL configuration or a pre-configured spatial QCL assumption, receiving the data transmission based on the time offset.

17 Claims, 19 Drawing Sheets

Related U.S. Application Data filed on Nov. 20, 2017, provisional application No. 62/571,326, filed on Oct. 12, 2017, provisional application No. 62/569,179, filed on Oct. 6, 2017, provisional application No. 62/565,758, filed on Sep. 29, 2017, provisional application No. 62/516,938, filed on Jun. 8, 2017, provisional application No. 62/511,892, filed on May 26, 2017.

(51) Int. Cl.
  *H04W 16/28* (2009.01)
  *H04W 72/08* (2009.01)
  *H04W 72/12* (2009.01)
  *H04L 5/00* (2006.01)
  *H04B 7/08* (2006.01)

(56) References Cited

OTHER PUBLICATIONS

Samsung, "On DL QCL for NR", 3GPP TSG RAN WG1#88b, R1-1705358, Apr. 2017, 6 pages.
Nokia et al., "BPL definition and Spatial QCL time indication", 3GPP TSG RAN WG1#89, R1-1708906, May 2017, 6 pages.
"3rd Generation Partnership Project; Technical Specification Group Services and System Aspects; Feasibility Study on New Services and Markets Technology Enablers; Stage 1 (Release 14)," 3GPP TR 22.891, V1.2.0; Nov. 2015, 96 pages.
"3rd Generation Partnership Project; Technical Specification Group Radio Access Network; Study on New Radio (NR) Access Technology Physical Layer Aspects (Release 14)," 3GPP TR 38.802, V1.1.0; Jan. 2017, 71 pages.
"3rd Generation Partnership Project; Technical Specification Group Radio Access Network; Evolved Universal Terrestrial Radio Access (E-UTRA); Physical Channels and Modulation (Release 14)," 3GPP TR 36.211, V14.1.0; Dec. 2016, 175 pages.
"3rd Generation Partnership Project; Technical Specification Group Radio Access Network; Evolved Universal Terrestrial Radio Access (E-UTRA); Multiplexing and Channel Coding (Release 14)," 3GPP TR 36.212, V14.1.0; Dec. 2016, 176 pages.
"3rd Generation Partnership Project; Technical Specification Group Radio Access Network; Evolved Universal Terrestrial Radio Access (E-UTRA); Physical Layer Procedures (Release 14)," 3GPP TR 36.213, V14.1.0; Dec. 2016, 414 pages.
"3rd Generation Partnership Project; Technical Specification Group Radio Access Network; Evolved Universal Terrestrial Radio Access (E-UTRA); Medium Access Control (MAC) Protocol Specification (Release 14)," 3GPP TR 36.321, V14.1.0; Dec. 2016, 98 pages.
"3rd Generation Partnership Project; Technical Specification Group Radio Access Network; Evolved Universal Terrestrial Radio Access (E-UTRA); Radio Resource Control (RRC) Protocol Specification (Release 14)," 3GPP TR 36.331, V14.1.0; Dec. 2016, 654 pages.

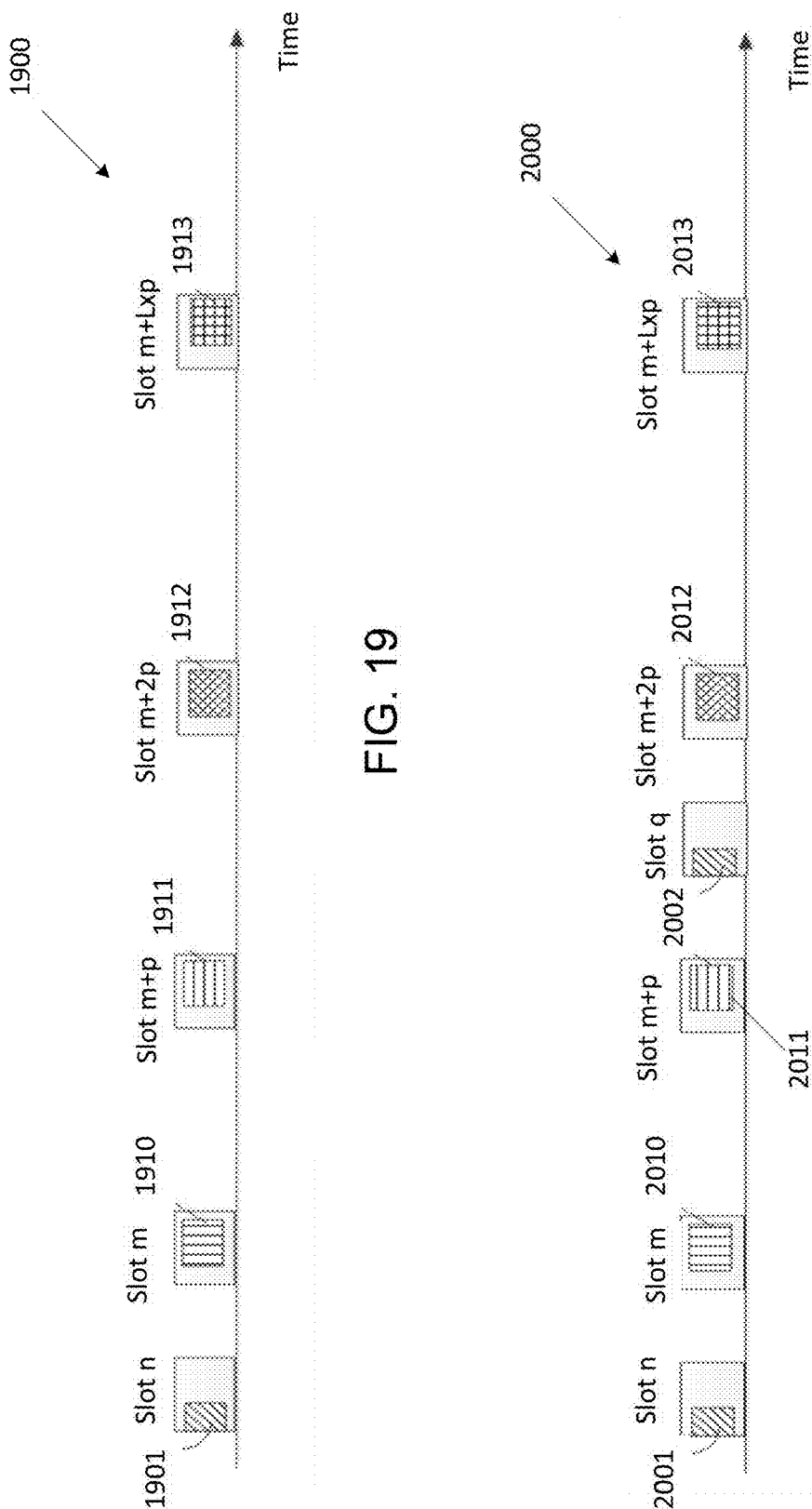

METHOD AND APPARATUS FOR BEAM INDICATION IN NEXT GENERATION WIRELESS SYSTEMS

CROSS-REFERENCE TO RELATED APPLICATION(S) AND CLAIM OF PRIORITY

The present application claims priority to:
U.S. Provisional Patent Application Ser. No. 62/511,892, filed on May 26, 2017;
U.S. Provisional Patent Application Ser. No. 62/516,938, filed on Jun. 8, 2017;
U.S. Provisional Patent Application Ser. No. 62/565,758, filed on Sep. 29, 2017;
U.S. Provisional Patent Application Ser. No. 62/569,179, filed on Oct. 6, 2017;
U.S. Provisional Patent Application Ser. No. 62/571,326, filed on Oct. 12, 2017;
U.S. Provisional Patent Application Ser. No. 62/588,586, filed on Nov. 20, 2017; and
U.S. Provisional Patent Application Ser. No. 62/597,791, filed on Dec. 12, 2017;
The content of the above-identified patent documents are incorporated herein by reference.

TECHNICAL FIELD

The present application relates generally to beam management. More specifically, this disclosure relates to beam indication scheme in an advanced wireless communication system.

BACKGROUND

In a wireless communication network, a network access and a radio resource management (RRM) are enabled by physical layer synchronization signals and higher (MAC) layer procedures. In particular, a user equipment (UE) attempts to detect the presence of synchronization signals along with at least one cell identification (ID) for initial access. Once the UE is in the network and associated with a serving cell, the UE monitors several neighboring cells by attempting to detect their synchronization signals and/or measuring the associated cell-specific reference signals (RSs). For next generation cellular systems such as third generation partnership-new radio access or interface (3GPP-NR), efficient and unified radio resource acquisition or tracking mechanism which works for various use cases such as enhanced mobile broadband (eMBB), ultra reliable low latency (URLLC), massive machine type communication (mMTC), each corresponding to a different coverage requirement and frequency bands with different propagation losses is desirable.

SUMMARY

Embodiments of the present disclosure provide beam recovery scheme in an advanced wireless communication system.

In one embodiment, a UE for a beam indication in a wireless communication system is provided. The UE includes a transceiver configured to receive, from a base station (BS), downlink control information (DCI) including scheduling information for a data transmission on a downlink data channel, wherein the DCI includes an index of a spatial quasi-co-location (QCL) configuration. The UE further includes a processor operably connected to the transceiver, the processor configured to compare a time offset between the data transmission and the DCI with a threshold that is pre-configured at the UE, and calculate a receive (Rx) beam based on the index of the spatial QCL configuration or a pre-configured spatial QCL assumption. The transceiver is further configured to receive the data transmission based on the time offset.

In another embodiment, a BS for a beam indication in a wireless communication system is provided. The BS includes a transceiver configured to transmit, to a user equipment (UE), downlink control information (DCI) including scheduling information for a data transmission on a downlink data channel, wherein the DCI includes an index of a spatial quasi-co-location (QCL) configuration, and transmit the data transmission using a receive (Rx) beam based on a time offset, wherein the a time offset between the data transmission and the DCI is calculated based on a threshold that is pre-configured at the UE. The Rx beam is calculated based on the index of the spatial QCL configuration or a pre-configured spatial QCL assumption at the UE.

In yet another embodiment, a method of a UE for a beam indication in a wireless communication system is provided. The method comprises receiving, from a base station (BS), downlink control information (DCI) including scheduling information for a data transmission on a downlink data channel, wherein the DCI includes an index of a spatial quasi-co-location (QCL) configuration, comparing a time offset between the data transmission and the DCI with a threshold that is pre-configured at the UE, calculating a receive (Rx) beam based on the index of the spatial QCL configuration or a pre-configured spatial QCL assumption, and receiving the data transmission based on the time offset.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 19 illustrates yet another example Rx beam calculation based on the spatial QCL assumption signaled in DCI according to embodiments of the present disclosure; and FIG. 20 illustrates yet another example Rx beam calculation based on the spatial QCL assumption signaled in DCI according to embodiments of the present disclosure.

DETAILED DESCRIPTION

FIG. 1 through FIG. 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v14.1.0, "E-UTRA, Physical channels and modulation;" 3GPP TS 36.212 v14.1.0, "E-UTRA, Multiplexing and Channel coding;" 3GPP TS 36.213 v14.1.0, "E-UTRA, Physical Layer Procedures;" 3GPP TS 36.321 v14.1.0, "E-UTRA, Medium Access Control (MAC) protocol specification;" and 3GPP TS 36.331 v14.1.0, "E-UTRA, Radio Resource Control (RRC) protocol specification," 3GPP TR 22.891 v1.2.0, "Feasibility Study on New Services and Markets Technology Enablers," and 3GPP TR 38.802 v1.1.0, "Technical Specification Group Radio Access Network; Study on New Radio Access Technology Physical Layer Aspects."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD- MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
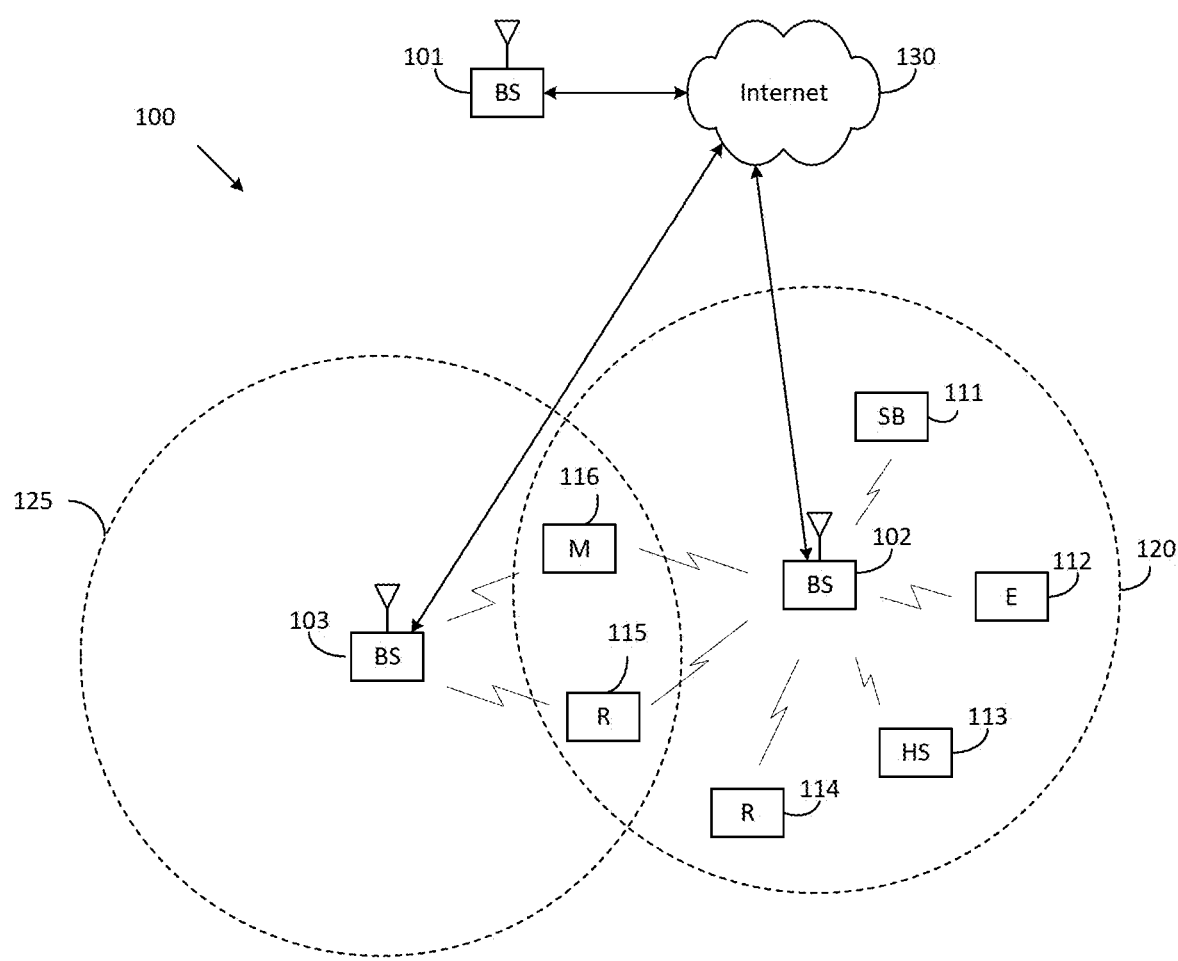
FIG. 1 illustrates an example wireless network according to embodiments of the present disclosure.
Figure 2:
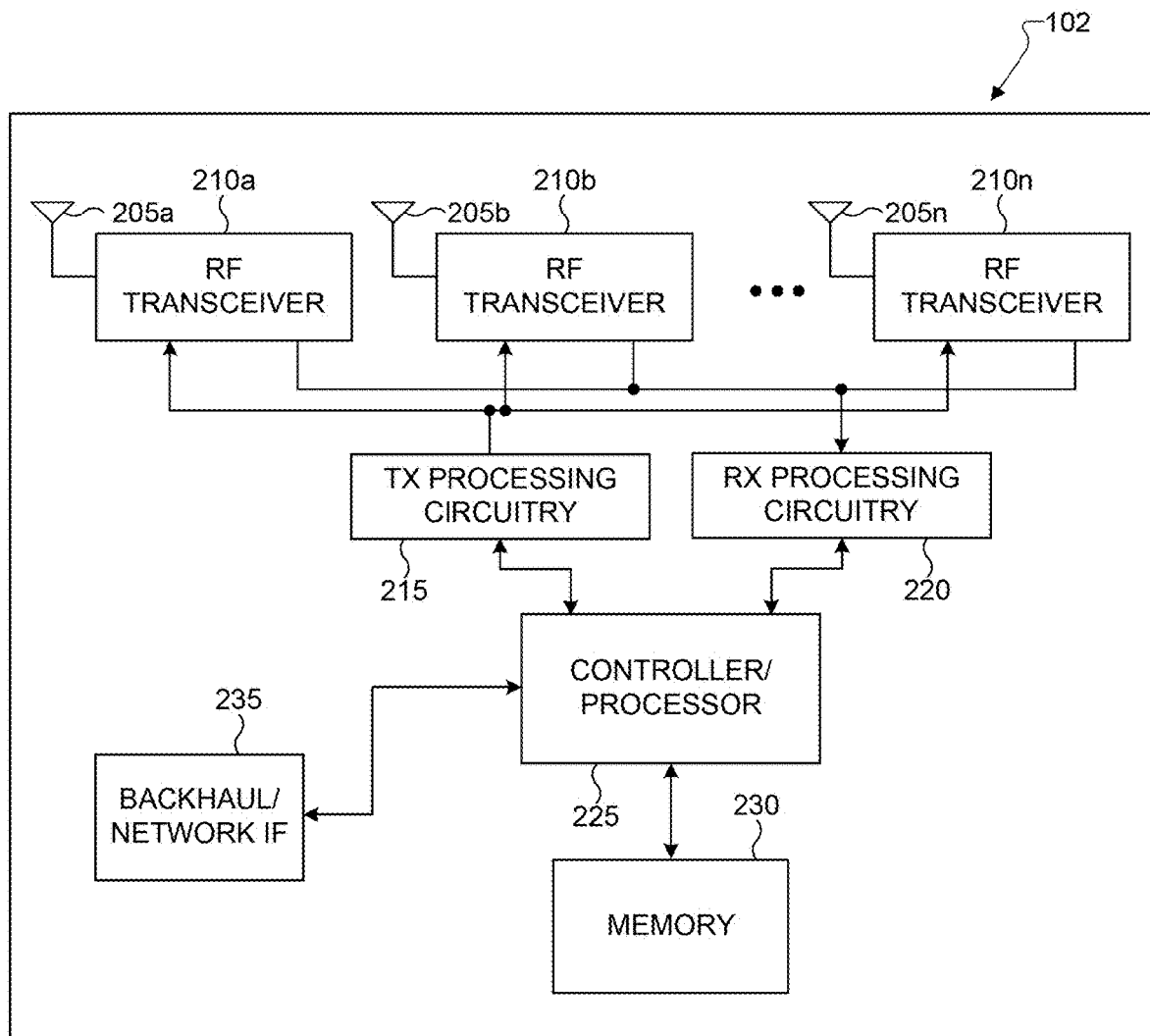
FIG. 2 illustrates an example eNB according to embodiments of the present disclosure.
Figure 3:
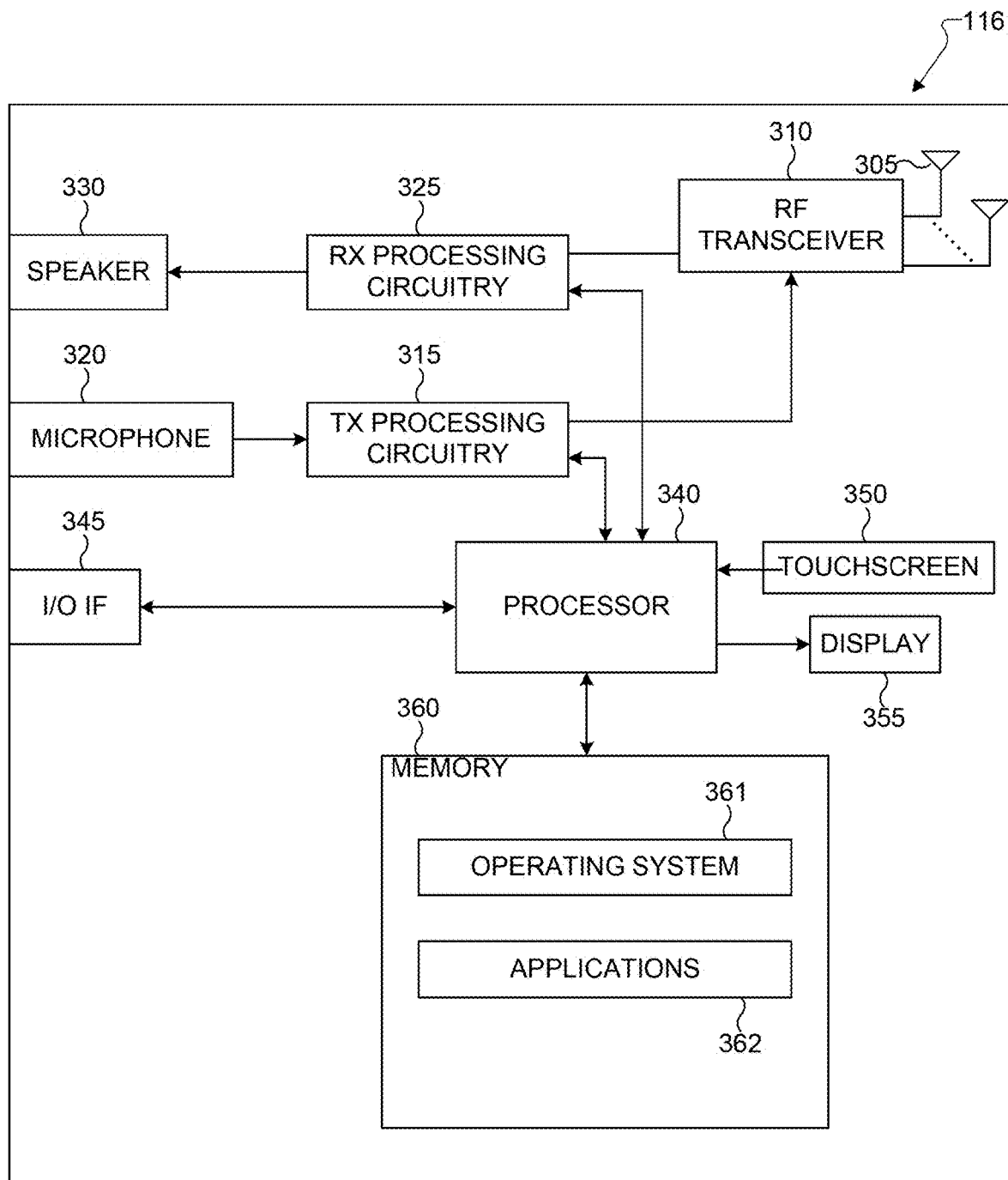
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of UEs within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient beam recovery in an advanced wireless communication system. In certain embodiments, and one or more of the eNBs 101-103 includes circuitry, programming, or a combination thereof, for receiving efficient beam recovery in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
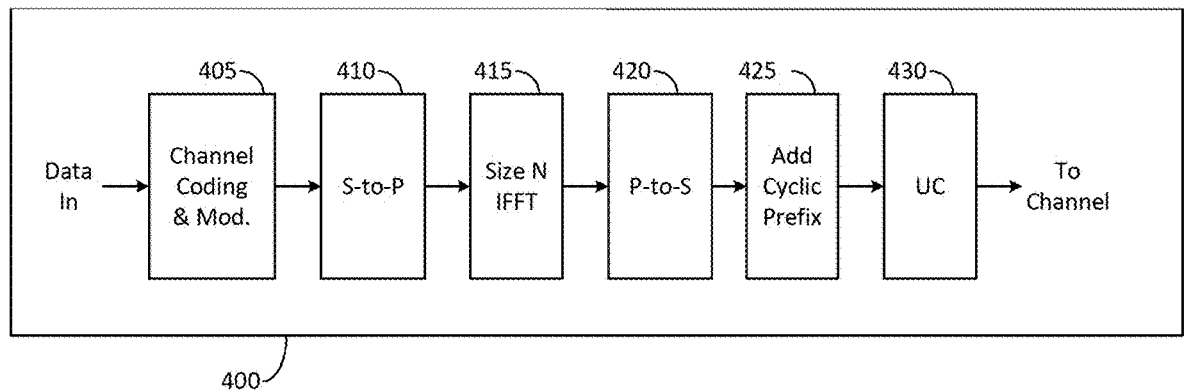
FIG. 4A illustrates a high-level diagram of an orthogonal frequency division multiple access transmit path according to embodiments of the present disclosure.
Figure 4B:
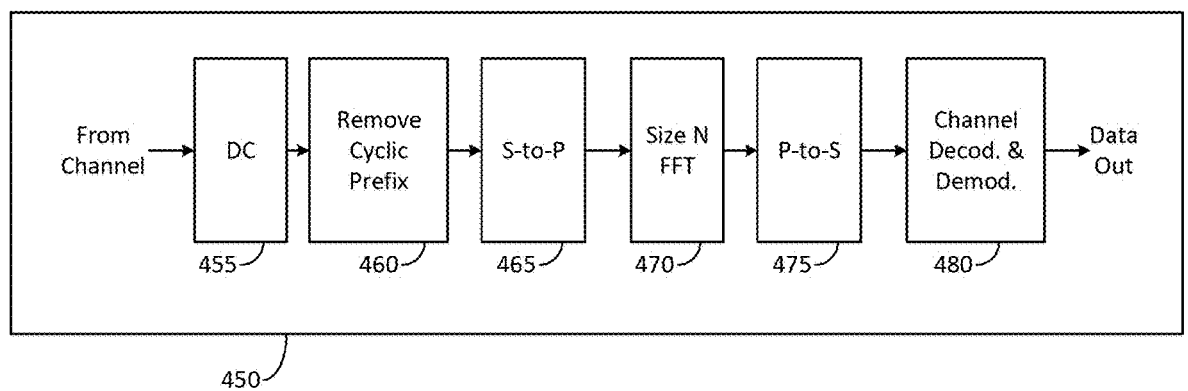
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the BCCH conveys a master information block (MIB) or to a DL shared channel (DL-SCH) when the BCCH conveys a system information block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with special system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSC}$ RBs for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $H_{symb}=2 \cdot (N_{symb}^{UL}-1)-N_{SRS}$ where $N_{SRS}=1$ if a last subframe symbol is used to transmit SRS and $N_{SRS}=0$ otherwise.

Figure 5:
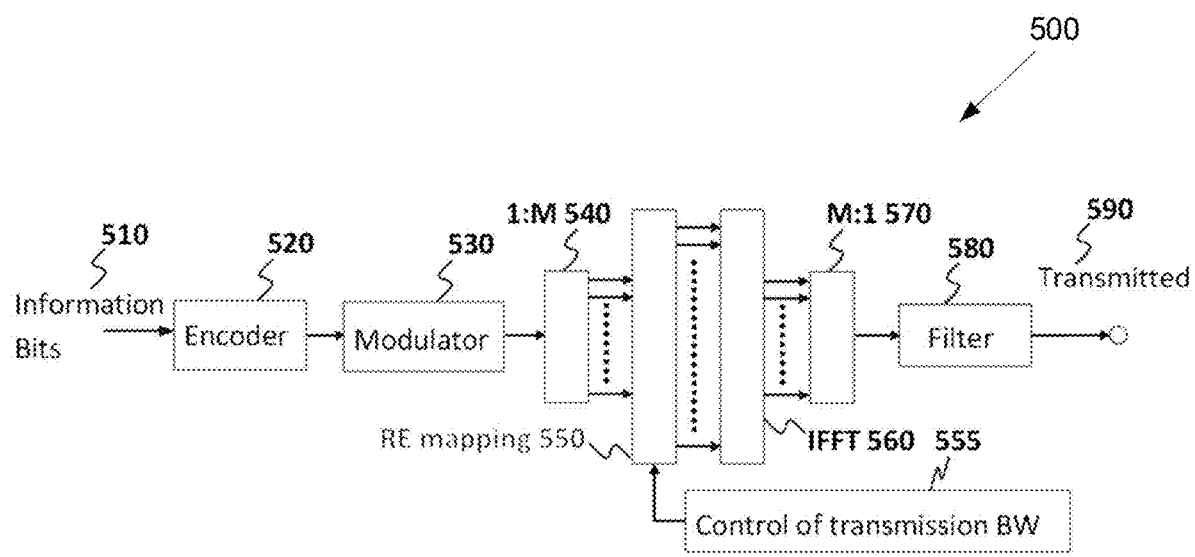
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
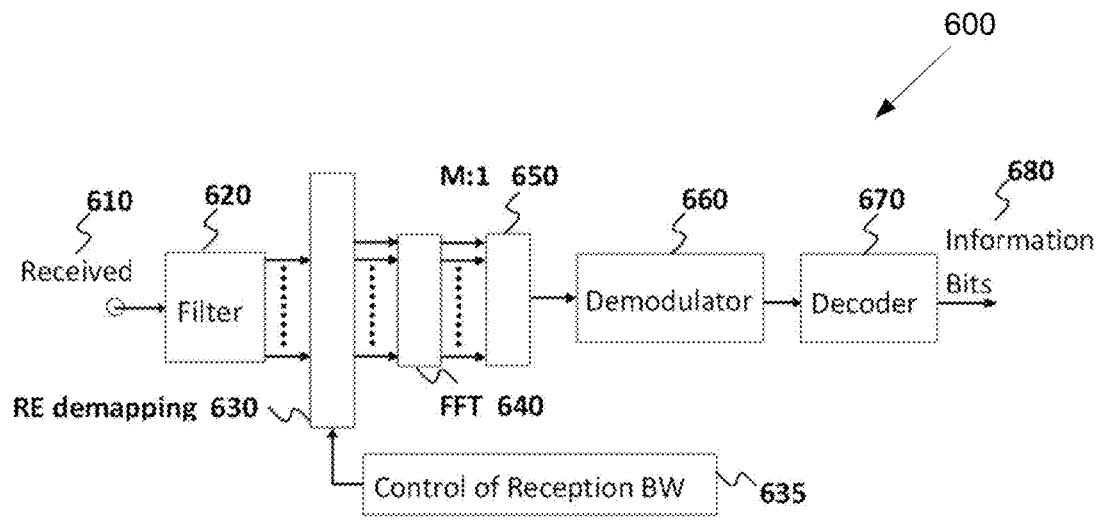
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
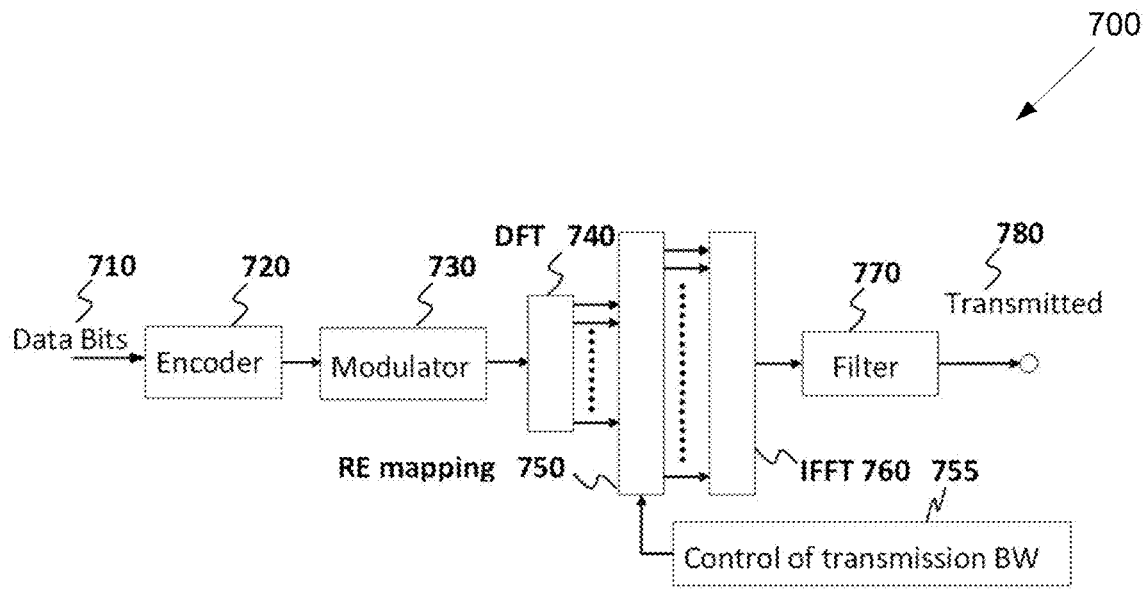
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
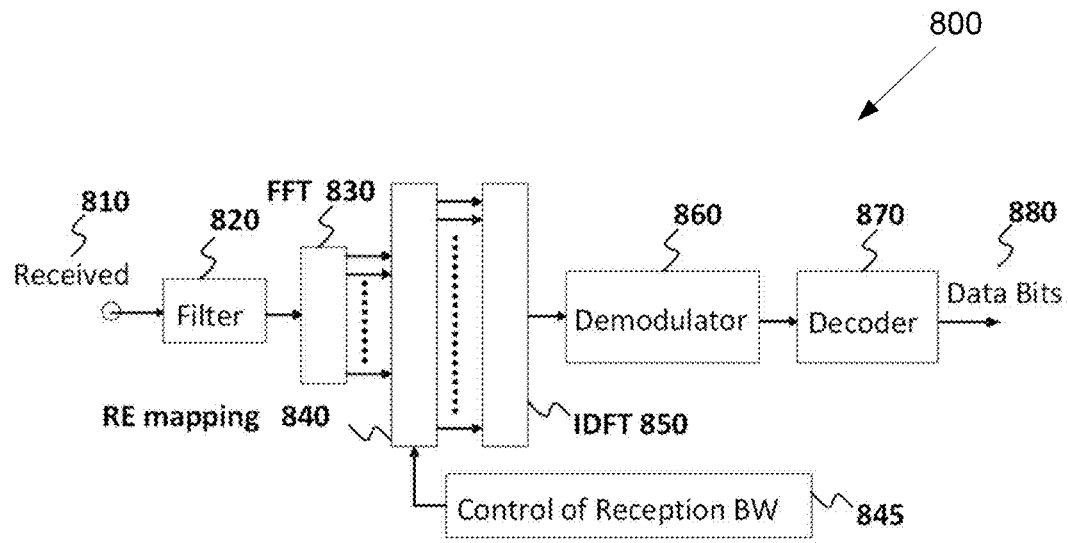
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed 'enhanced mobile broadband' (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per km$^2$ with less stringent the reliability, data rate, and latency requirements.

In order for the 5G network to support such diverse services with different quality of services (QoS), one method has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
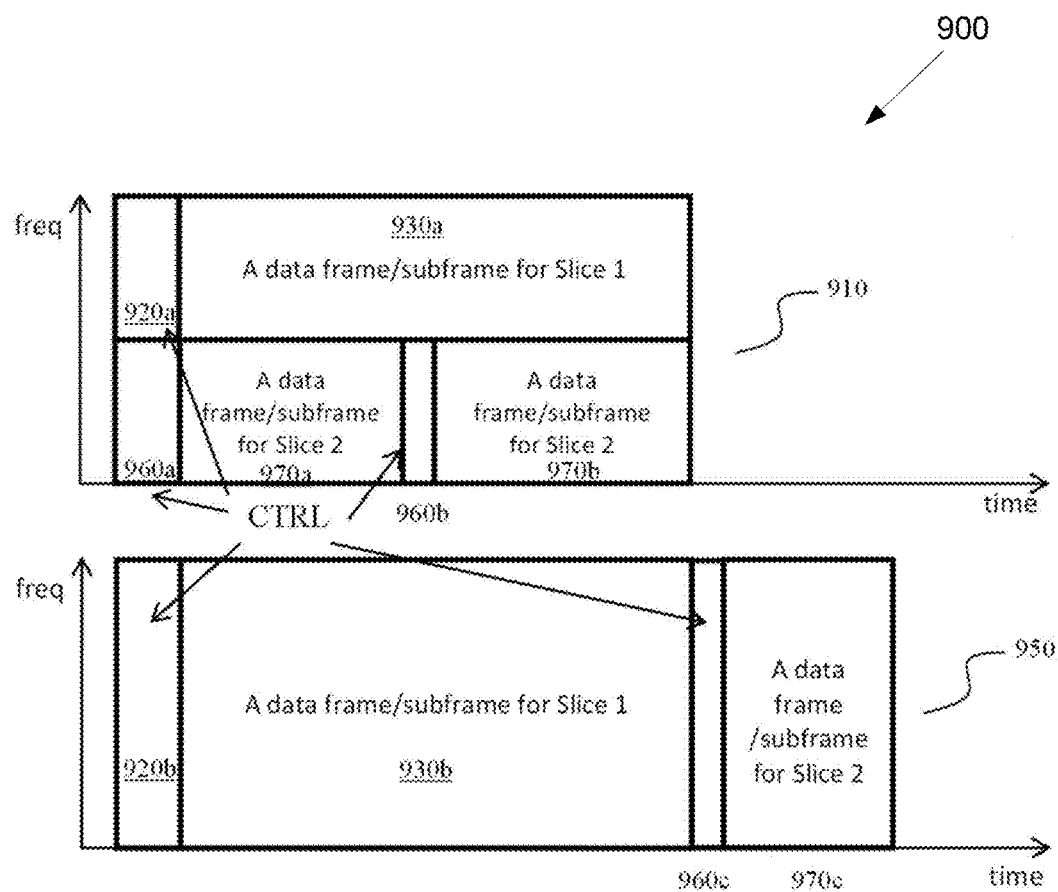
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920*a*, 960*a*, 960*b*, 920*b*, or 960*c*) and a data component (e.g., 930*a*, 970*a*, 970*b*, 930*b*, or 970*c*). In embodiment 910, the two slices are multiplexed in frequency domain whereas in embodiment 950, the two slices are multiplexed in time domain. These two slices can be transmitted with different sets of numerology.

LTE specification supports up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
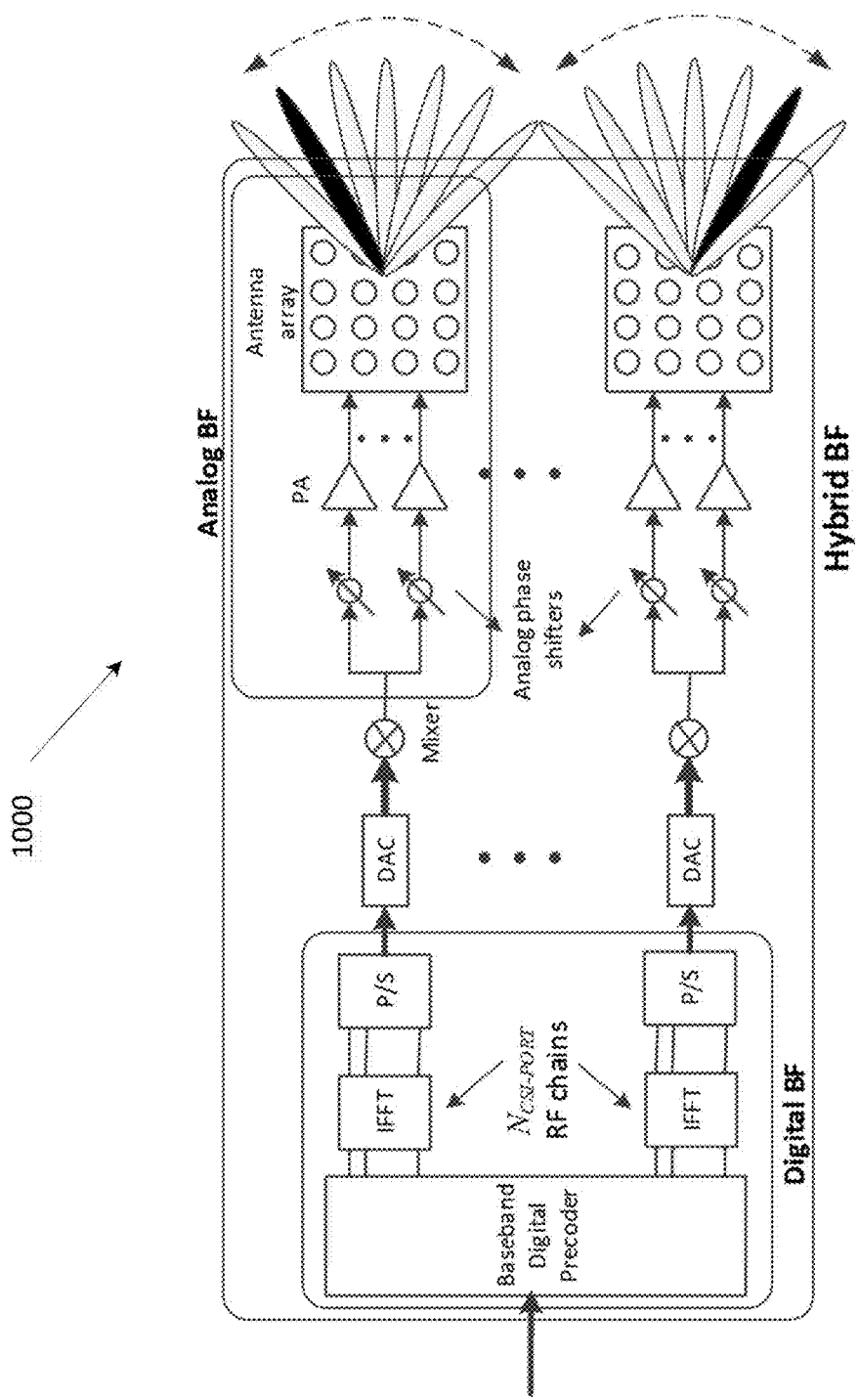
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

In a 3GPP LTE communication system, network access and radio resource management (RRM) are enabled by physical layer synchronization signals and higher (MAC) layer procedures. In particular, a UE attempts to detect the presence of synchronization signals along with at least one cell ID for initial access. Once the UE is in the network and associated with a serving cell, the UE monitors several neighboring cells by attempting to detect their synchronization signals and/or measuring the associated cell-specific RSs (for instance, by measuring their RSRPs). For next generation cellular systems such as 3GPP NR (new radio access or interface), efficient and unified radio resource acquisition or tracking mechanism which works for various use cases (such as eMBB, URLLC, mMTC, each corresponding to a different coverage requirement) and frequency bands (with different propagation losses) is desirable. Most likely designed with a different network and radio resource paradigm, seamless and low-latency RRM is also desirable. Such goals pose at least the following problems in designing an access, radio resource, and mobility management framework.

First, since NR is likely to support even more diversified network topology, the notion of cell can be redefined or replaced with another radio resource entity. As an example, for synchronous networks, one cell can be associated with a plurality of TRPs (transmit-receive points) similar to a COMP (coordinated multipoint transmission) scenario in LTE specification. In this case, seamless mobility is a desirable feature.

Second, when large antenna arrays and beamforming are utilized, defining radio resource in terms of beams (although possibly termed differently) can be a natural approach. Given that numerous beamforming architectures can be utilized, an access, radio resource, and mobility management framework which accommodates various beamforming architectures (or, instead, agnostic to beamforming architecture) is desirable.

Figure 11:
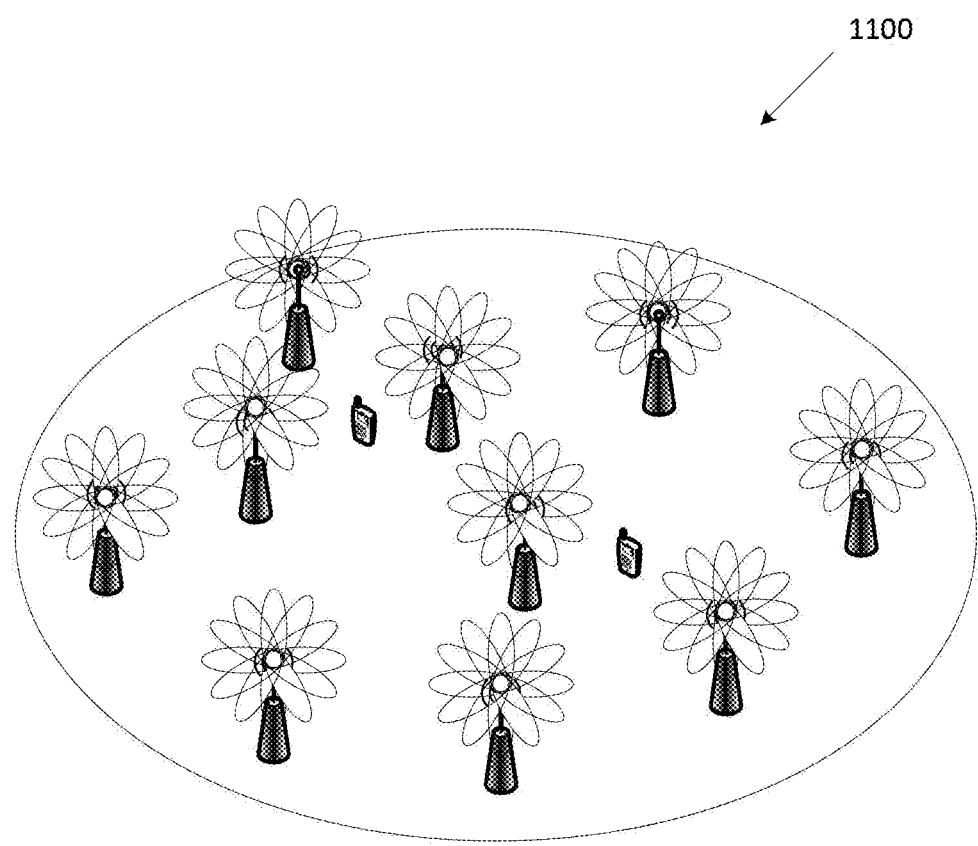
FIG. 11 illustrates an example UE mobility scenario according to embodiments of the present disclosure.

FIG. 11 illustrates an example UE mobility scenario 1100 according to embodiments of the present disclosure. The embodiment of the UE mobility scenario 1100 illustrated in FIG. 11 is for illustration only. FIG. 11 does not limit the scope of this disclosure to any particular implementation of the UE mobility scenario 1100.

For instance, the framework may be applicable for or agnostic to whether one beam is formed for one CSI-RS port (for instance, where a plurality of analog ports are connected to one digital port, and a plurality of widely separated digital ports are utilized) or one beam is formed by a plurality of CSI-RS ports. In addition, the framework may be applicable whether beam sweeping (as illustrated in FIG. 11) is used or not.

Third, different frequency bands and use cases impose different coverage limitations. For example, mmWave bands impose large propagation losses. Therefore, some form of coverage enhancement scheme is needed. Several candidates include beam sweeping (as shown in FIG. 10), repetition, diversity, and/or multi-TRP transmission. For mMTC where transmission bandwidth is small, time-domain repetition is needed to ensure sufficient coverage.

A UE-centric access which utilizes two levels of radio resource entity is described in FIG. 11. These two levels can be termed as "cell" and "beam". These two terms are exemplary and used for illustrative purposes. Other terms such as radio resource (RR) 1 and 2 can also be used. Additionally, the term "beam" as a radio resource unit is to be differentiated with, for instance, an analog beam used for beam sweeping in FIG. 10.

As shown in FIG. 11, the first RR level (termed "cell") applies when a UE enters a network and therefore is engaged in an initial access procedure. In 1110, a UE 1111 is connected to cell 1112 after performing an initial access procedure which includes detecting the presence of synchronization signals. Synchronization signals can be used for coarse timing and frequency acquisitions as well as detecting the cell identification (cell ID) associated with the serving cell. In this first level, the UE observes cell boundaries as different cells can be associated with different cell IDs. In FIG. 11, one cell is associated with one TRP (in general, one cell can be associated with a plurality of TRPs). Since cell ID is a MAC layer entity, initial access involves not only physical layer procedure(s) (such as cell search via synchronization signal acquisition) but also MAC layer procedure(s).

The second RR level (termed "beam") applies when a UE is already connected to a cell and hence in the network. In this second level, a UE 1111 can move within the network without observing cell boundaries as illustrated in FIG. 11. That is, UE mobility is handled on beam level rather than cell level, where one cell can be associated with N beams (N can be 1 or >1). Unlike cell, however, beam is a physical layer entity. Therefore, UE mobility management is handled solely on physical layer. An example of UE mobility scenario based on the second level RR is given in FIG. 11.

After the UE 1111 is associated with the serving cell 1112, the UE 1111 is further associated with beam 1151. This is achieved by acquiring a beam or radio resource (RR) acquisition signal from which the UE can acquire a beam identity or identification. An example of beam or RR acquisition signal is a measurement reference signal (RS). Upon acquiring a beam (or RR) acquisition signal, the UE 1111 can report a status to the network or an associated TRP. Examples of such report include a measured beam power (or measurement RS power) or a set of at least one recommended "beam identity (ID)" or "RR-ID". Based on this report, the network or the associated TRP can assign a beam (as a radio resource) to the UE 1111 for data and control transmission. When the UE 1111 moves to another cell, the boundary between the previous and the next cells is neither observed nor visible to the UE 1111. Instead of cell handover, the UE 1111 switches from beam 1151 to beam 1152. Such a seamless mobility is facilitated by the report from UE 711 to the network or associated TRP—especially when the UE 1111 reports a set of M>1 preferred beam identities by acquiring and measuring M beam (or RR) acquisition signals.

In the present disclosure, a "beam" can correspond to an RS resource or one port in RS or one port+one time unit in RS, whether the beam is a sounding reference signal (SRS), CSI-RS, beam RS, measurement RS, or any other type of RS.

In high frequency band system (e.g., >6 GHz system), the TRP and the UE can be deployed with large number of antennas to relay on the high gain beamforming to defeat the large path loss and signal blockage. A general system configuration is that the TRP and UE have large number antenna but only one or a few TXRUs. So hybrid beamforming mechanism is utilized. Analog beams with different direction can be formulated on the antenna array that is connected to one TXRU. To get the best link quality and coverage distance, the TRP and UE need to align the analog beam directions for each particular downlink and uplink transmission.

In some embodiment, when a UE detects a beam failure event, the UE can be requested to transmit beam recovery request and then monitor for the beam recovery response from a TRP. If no proper response for the beam recovery request is received within configured time duration $T_0$, the UE can be configured to re-send the beam recovery request until a proper beam recovery response is received by the UE or the maximal number of beam recovery request transmission is achieved.

In the present disclosure, a "beam" can correspond to an RS resource, whether it is a sounding reference signal (SRS), CSI-RS, beam RS, measurement RS, or any other type of RS.

In high frequency band system (e.g., >6 GHz system), the TRP and the UE can be deployed with large number of antennas to relay on the high gain beamforming to defeat the large path loss and signal blockage. A general system configuration is that the TRP and UE have large number antenna but only one or a few TXRUs. So hybrid beamforming mechanism is utilized. Analog beams with different direction can be formulated on the antenna array that is connected to one TXRU. To get the best link quality and coverage distance, the TRP and UE need to align the analog beam directions for each particular downlink and uplink transmission.

In the present disclosure, the methods of beam indication for downlink control/data channel and uplink control and data channels are provided.

In some embodiments, some bits in a downlink DCI can be used to indicate spatial QCL assumption between downlink RS and DMRS antenna port(s) of one or more downlink PDSCH allocation(s). From the information of spatial QCL assumption, one UE can calculate a receive beam that is used to receive the NR-PDSCH transmission. In the downlink DCI, that few bits of spatial QCL assumption can be an identity of a BPL (beam pair link), an identity of beam tag, an identity of one CSI-RS resource, an identity of one NR-SRS block time index, an identity of Rx beam set, an identity of Rx beam, an identity of NR-SRS resource.

In one example, a downlink DCI can signal the information of Rx beam for the corresponding PDSCH that is scheduled by that downlink DCI. The UE can be requested to first decode one DCI. From the decoded DCI, the UE can obtain the following information: the allocation information of PDSCH: the slot and PRB location, the MCS information; and the spatial QCL assumption for DMRS antenna ports of this allocated PDSCH.

Figure 12:
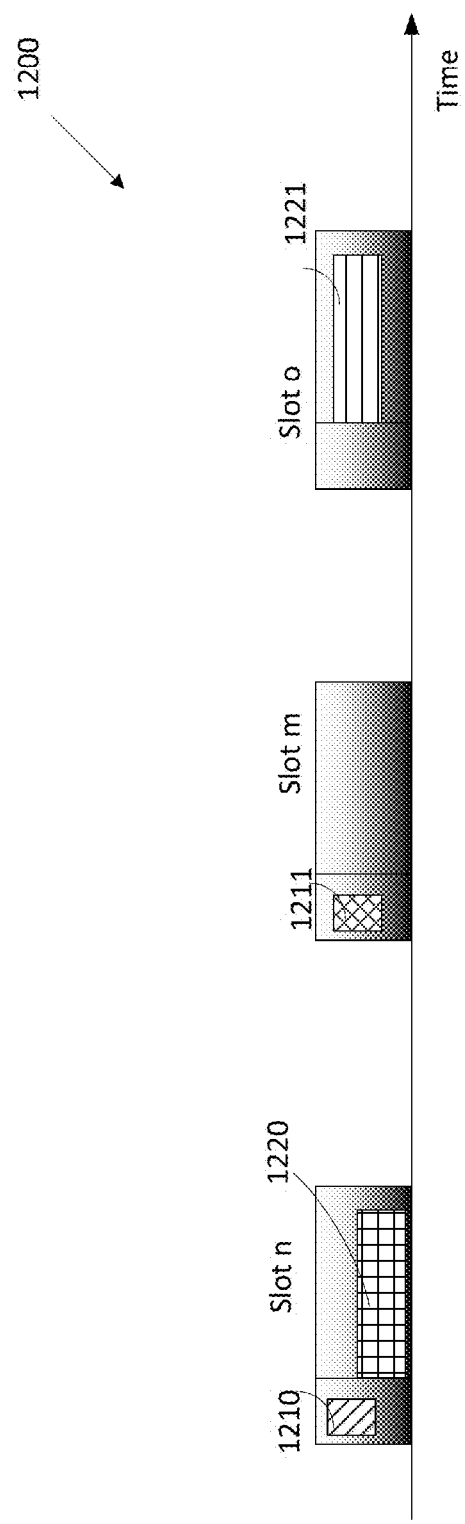
FIG. 12 illustrates an example Rx beam calculation based on the spatial QCL assumption signaled in DCI according to embodiments of the present disclosure.

FIG. 12 illustrates an example Rx beam calculation 1200 based on the spatial QCL assumption signaled in DCI according to embodiments of the present disclosure. The embodiment of the Rx beam calculation 1200 illustrated in FIG. 12 is for illustration only. FIG. 12 does not limit the scope of this disclosure to any particular implementation.

The UE can be requested to calculate one or more Rx beam(s) based on the spatial QCL assumption signaled in DCI and then use the calculated Rx beam to buffer the allocated PDSCH. An example is shown in FIG. 12. Downlink DCI 1210 is used to allocate a PDSCH 1220 in the same slot, slot n. DCI 1210 signals the spatial QCL assumption for PDSCH 1220. The UE can be requested to first decode downlink DCI 1210 and then calculate Rx beam based on the spatial QCL assumption carried in DCI 1210. The UE can be requested to receive the DMRS and data in PDSCH 1220 with the calculated Rx beam. In the example of FIG. 12, downlink DCI 1211 is used to allocate a PDSCH 1221 with cross-slot scheduling method. DCI 1211 is sent in slot m and scheduled PDSCH 1221 of the DCI 1211 is allocated in slot o (o>m). The UE can be requested to first downlink DCI 1211 at slot m. From the information in DCI 1211, the UE can obtain the allocation information of PDSCH 1221 in slot o and the spatial QCL assumption for PDSCH 1221.

When a DCI and corresponding scheduled PDSCH of the DCI are transmitted in the same slot, the UE might meet a difficulty in choosing the proper Rx beam due to the decoding latency of DCI. The UE needs to finish the decoding of DCI before the OFDM symbol where the transmission of PDSCH starts. Only after finishing decoding the DCI, the UE can obtain the spatial QCL assumption signaled in the DCI and then the UE can choose and switch to proper analog Rx beam to buffer the scheduled PDSCH. That might put challenge in UE implementation complexity and PDCCH/PDSCH scheduling flexibility. Regarding the UE implementation complexity, the UE needs to finish DCI decoding before the transmission of PDSCH starts. The last OFDM symbol where a DCI is mapped to cannot be adjacent to the first OFDM symbol of corresponding PDSCH allocation of the DCI. We need solution to deal with that difficulty.

In one embodiment, the UE can be requested to obtain the spatial QCL assumption and calculate the Rx beam based on the time offset, $\Delta_t$, between the scheduling DCI and the corresponding scheduled PDSCH.

In one example, if the $\Delta_t$ is larger than (or equal) to a threshold T, the UE can be requested to obtain the spatial QCL assumption from the TCI state signaled by N-bit TCI field in that DCI and then calculate the Rx beam based on the spatial QCL assumption information for the reception of corresponding PDSCH allocation. In such example, the condition can be: if DCI is received by the UE in slot n and the PDSCH is scheduled in one of the slot n to slot n+T, where T can be a value of 0, 1, 2, 3, . . . .

In another example, if the $\Delta_t$ is less than (or equal to) some threshold T, the UE can be configured to use a secondary spatial QCL assumption configuration to calculate the Rx beam for reception of the corresponding scheduled PDSCH in the same slot. Here the condition can be If DCI is received by the UE in slot n and the PDSCH is scheduled in one of the slot after slot n+T, where T can be a value of 0, 1, 2, 3, . . . .

In one instance, a secondary spatial QCL assumption can be the spatial QCL assumption configured for the corresponding DCI that schedules that PDSCH. In other word, a secondary spatial QCL assumption can be spatial CQL assumption indicated by the TCI (transmission configuration indication) state configured for the CORSET where the corresponding assignment DCI is transmitted.

In another instance, a secondary spatial QCL assumption can be configured to the UE through a dedicated signaling, for example higher layer signaling RRC and/or MAC-CE.

In yet another instance, a secondary spatial QCL assumption can be the spatial QCL assumption signaled in one previous DCI, e.g., the last DCI before the DCI that allocates this PDSCH. In one example, it is the last DCI that is sent at least T time earlier than the time of this PDSCH is scheduled.

In yet another instance, a secondary spatial QCL assumption can be the spatial QCL associated with one particular TCI state index. For example, a secondary spatial QCL assumption can be the spatial QCL associated with TCI state index 000. For example, a secondary spatial QCL assumption can be the spatial QCL associated with TCI state index 111.

In one embodiment, if the threshold T is equal to one slot, the UE can be requested to follow the following behavior. In one example, for PDSCH scheduled in the same slot, the UE can be requested to assume the spatial QCL assumption of DMRS of PDSCH is same to the spatial QCL assumption configured for one CORESET with the lowest ID in the same slot. In another example, for PDSCH being cross-scheduled, i.e., the scheduling offset between PDCCH and PDSCH is >1 slot, the UE can be requested to assume the spatial QCL assumption of DMRS of PDSCH is indicated by the TCI field in the assignment DCI.

If the threshold T is larger than one slot, i.e., the threshold T is equal or larger than two slots, the UE can be requested to follow the following behavior. In one example, if the offset between reception of the DL DCI and the corresponding PDSCH is less than the threshold T, the UE may assume that the antenna ports of DMRS of PDSCH are quasi co-located based on the TCI state used for PDCCH quasi-co-location indication of the lowest CORESET ID in the latest slot where one or more CORESETs is configured for that UE. The quasi co-location includes spatial QCL, i.e., spatial Rx parameter. In another example, the threshold T can be number of slots, number of OFDM symbols, in microseconds, and/or milliseconds.

In one embodiment, the threshold T can be calculated by the following procedure: (1) one UE reports a time during $T_0$ that is the minimum time duration this UE needs between PDCCH and PDSCH so that this UE is able to decode the DCI and obtain the spatial QCL assumption carried in DCI in time before the starting time of the transmission of the PDSCH; (2) then in a first BWP, one UE is configured with slot length $T_{slot}$; and (3) then for a first BWP, the threshold T can be calculated as $$T = \left\lceil \frac{T_0}{T_{slot}} \right\rceil$$

slots.

In one embodiment, the threshold T can be calculated by the follow procedure: (1) one UE reports a time during $T_0$ that is the minimum time duration this UE needs between PDCCH and PDSCH so that this UE is able to decode the DCI and obtain the spatial QCL assumption carried in DCI in time before the starting time of the transmission of the PDSCH; (2) then in a first BWP, one UE is configured with OFDM symbol length $T_{sym}$; and (3) then for a first BWP, the threshold T can be calculated as $$T = \left\lceil \frac{T_0}{T_{sym}} \right\rceil$$

OFDM symbols. In such example, the threshold T can be calculated as $$T = \left\lceil \frac{T_0}{T_{sym}} \right\rceil + 1$$

OFDM symbols

In one embodiment, the UE can be requested to obtain the spatial QCL assumption and calculate the Rx beam based on the slot locations of the scheduling DCI and the corresponding scheduled a first PDSCH. In one example, if DCI is received by the UE in slot n and the PDSCH is scheduled in one of the slots after slot n+T, where T can be a value of 0, 1, 2, 3, . . . . The UE can be requested to obtain the spatial QCL assumption from the TCI state signaled by N-bit TCI field in that DCI and then calculate the Rx beam based on the spatial QCL assumption information for the reception of corresponding PDSCH allocation.

In another example, if DCI is received by the UE in slot n and the PDSCH is scheduled in one of the slots slot n to slot n+T, where T can be a value of 0, 1, 2, 3, . . . , the UE can be configured to use a secondary spatial QCL assumption configuration to calculate the Rx beam for reception of the corresponding scheduled PDSCH in the same slot. A secondary spatial QCL assumption can be spatial QCL assumption signaled by N-bit TCI fields signaled in the last DCI that is sent in one slot no later than slot m−T, where m is the slot where a first PDSCH is scheduled to. In one example, a secondary spatial QCL assumption can be configured to the UE through a dedicated signaling, for example higher layer signaling RRC and/or MAC-CE.

In one instance, a secondary spatial QCL assumption can be the spatial QCL assumption configured for the corresponding DCI that schedules that PDSCH. In other word, a secondary spatial QCL assumption can be spatial CQL assumption indicated by the TCI (transmission configuration indication) state configured for the CORSET where the corresponding assignment DCI is transmitted.

In one embodiment, the UE can be requested to obtain the spatial QCL assumption and calculate the Rx beam based on the whether a DCI and scheduled PDSCH of the DCI are in the same slot or different slots. When a DCI and allocated PDSCH of the DCI are in two different slots, the UE can be requested to obtain the spatial QCL assumption from the TCI state signaled by N-bit TCI field in that DCI and then calculate the Rx beam based on the spatial QCL assumption information for the reception of corresponding PDSCH allocation. When a DCI and allocated PDSCH of the DCI are in the same slot (i.e., same-slot scheduling), the UE can be configured to use a secondary spatial QCL assumption configuration to calculate the Rx beam for reception of the corresponding scheduled PDSCH in the same slot.

In one example, a secondary spatial QCL assumption can be the spatial QCL assumption configured for the corresponding DCI that schedules that PDSCH. In other word, a secondary spatial QCL assumption can be spatial CQL assumption indicated by the TCI (transmission configuration indication) state configured for the CORSET where the corresponding assignment DCI is transmitted.

In another example, a secondary spatial QCL assumption can be configured to the UE through a dedicated signaling, for example higher layer signaling RRC and/or MAC-CE.

In yet another example, a secondary spatial QCL assumption can be the spatial QCL assumption signaled in one previous DCI, e.g., the last DCI before the DCI that allocates this PDSCH.

Figure 13A:
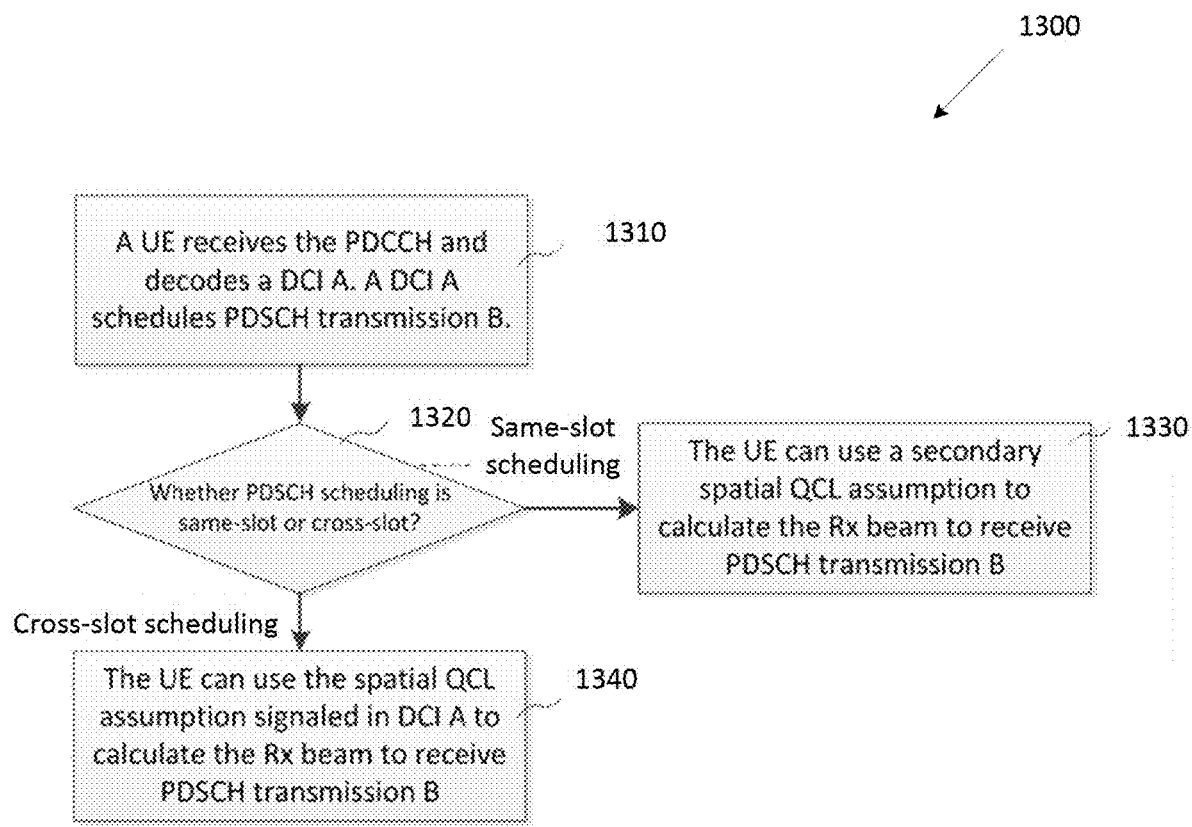
FIG. 13A illustrates a flow chart of a procedure for calculating Rx beam according to embodiments of the present disclosure.

FIG. 13A illustrates a flow chart of a procedure 1300 for calculating Rx beam according to embodiments of the present disclosure. The embodiment of the procedure 1300 illustrated in FIG. 13A is for illustration only. FIG. 13A does not limit the scope of this disclosure to any particular implementation.

An example procedure is shown in FIG. 13A. A UE can received PDCCH and decode a DCI A in slot 1310. The DCI A schedules PDSCH transmission B. The UE determine whether PDSCH scheduling is same-slot or cross-slot in 1320. If the PDSCH scheduling is same-slot scheduling, the UE can use a configured secondary spatial QCL assumption to calculate the Rx beam that can be used to receive the PDSCH transmission B in slot 1330. If the PDSCH scheduling is cross-slot scheduling, the UE can use the spatial QCL assumption signaled in DCI A to calculate the Rx beam that can be used to receive the PDSCH transmission B.

Figure 13B:
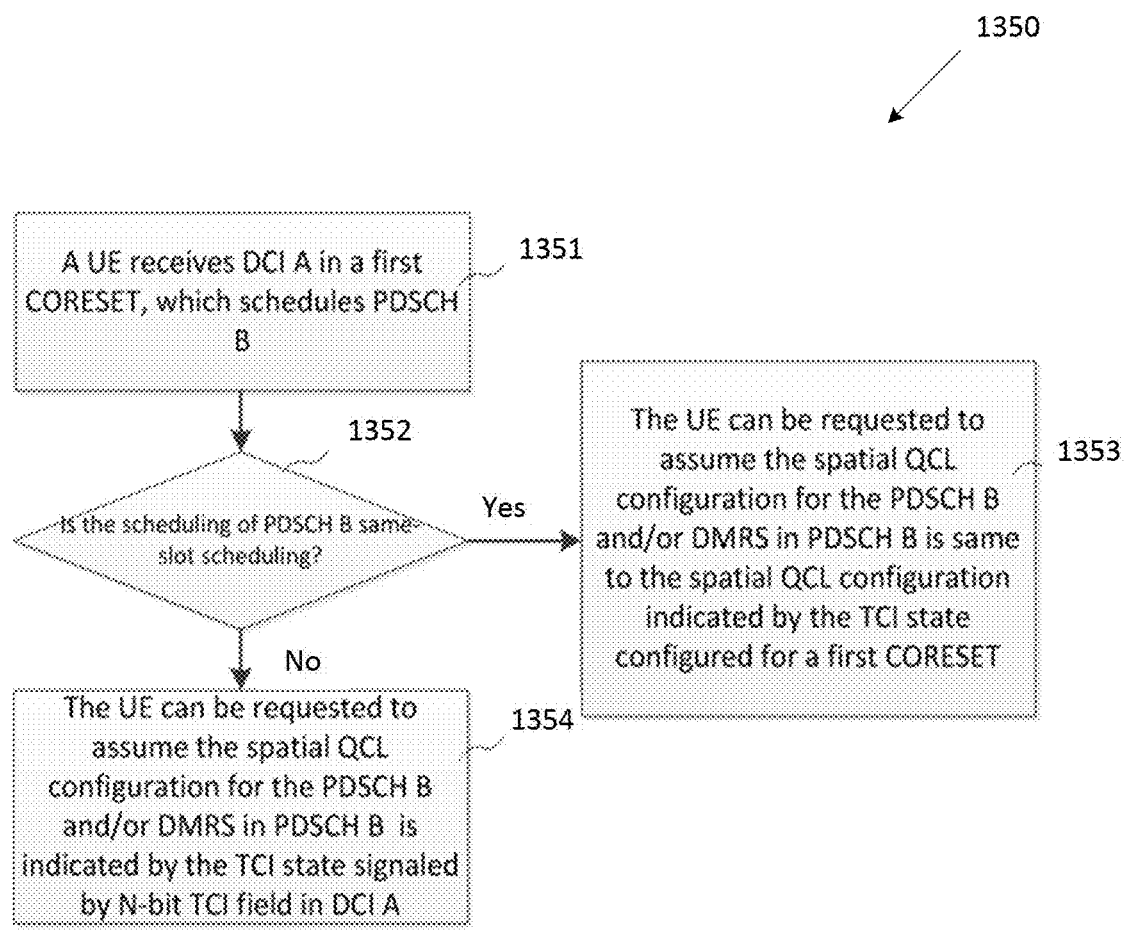
FIG. 13B illustrates a flow chart of a procedure for obtaining spatial QCL assumption for PDSCH in a slot according to embodiments of the present disclosure.

FIG. 13B illustrates a flow chart of a procedure 1350 for obtaining spatial QCL assumption for PDSCH in a slot according to embodiments of the present disclosure. The embodiment of the procedure 1350 illustrated in FIG. 13B is for illustration only. FIG. 13B does not limit the scope of this disclosure to any particular implementation.

A UE is configured to monitor a first CORESET. The UE receives DCI A in a first CORESET and the DCI A schedules PDSCH B to the UE 1351. The UE can determine whether the scheduling is same-slot scheduling or cross-slot scheduling 1352. When the scheduling for PDSCH B is same-slot scheduling 1353, the UE can be requested to assume the spatial QCL configuration for PDSCH B and DMRS in PDSCH B is same to the spatial QCL configuration indicated by the TCI state configured for a first CORESET. When the scheduling for PDSCH B is cross-slot scheduling 1354, the UE can be requested to assume the spatial QCL configuration for PDSCH B and DMRS in PDSCH B is indicated by the TCI state signaled by N-bit TCI field in DCI A.

In one embodiment, when the UE is scheduled with a first PDSCH allocation and a second PDSCH allocation. A first PDSCH allocation and a second PDSCH allocation are scheduled by two different DCIs. A first PDSCH is scheduled by a first DCI and a second PDSCH is scheduled by a second DCI. A first PDSCH and a second PDSCH are scheduled in one same slot, slot n, and the resource allocation of a first PDSCH and a second PDSCH allocation have some overlaps on some OFDM symbol. If the spatial QCL configuration for a first PDSCH that the UE calculates is different from the spatial QCL configuration for a second PDSCH that the UE calculates, the UE can be requested to do one or more of the following.

In one example, the UE can assume the spatial QCL configuration for a first PDSCH and a second PDSCH is same to the spatial QCL configuration indicated by the TCI state configured to one CORESET configured to the UE at slot n.

In another example, if a first PDSCH is cross-slot scheduling and a second PDSCH is same-slot scheduling, the UE can assume the spatial QCL configuration for a first PDSCH and a second PDSCH is same to the spatial QCL configuration indicated by the TCI state signaled by the N-bit TCI field in a first DCI.

In yet another example, if a second PDSCH is cross-slot scheduling and a first PDSCH is same-slot scheduling, the UE can assume the spatial QCL configuration for a first PDSCH and a second PDSCH is same to the spatial QCL configuration indicated by the TCI state signaled by the N-bit TCI field in a second DCI.

In yet another example, if both a first PDSCH and a second PDSCH are same-slot scheduling, the UE can assume the spatial QCL configuration for a first PDSCH and a second PDSCH is same to the spatial QCL configuration indicated by the TCI state configured for the CORESET where a first DCI or a second DCI is sent.

In yet another example, if both a first PDSCH and a second PDSCH are different-slot scheduling and a first DCI is transmitted later than a second DCI, the UE can assume the spatial QCL configuration for a first PDSCH and a second PDSCH is same to the spatial QCL configuration indicated by the TCI state signaled by N-bit TCI field in a first DCI.

In yet another example, if both a first PDSCH and a second PDSCH are cross-slot scheduling and a second DCI is transmitted later than a second DCI, the UE can assume the spatial QCL configuration for a first PDSCH and a second PDSCH is same to the spatial QCL configuration indicated by the TCI state signaled by N-bit TCI field in a second DCI.

In yet another example, if both a first PDSCH and a second PDSCH are cross-slot scheduling and a first DCI and a second DCI are transmitted in the same slot, the UE can be requested assume the spatial QCL configuration configured by the TCI state signaled by N-bit TCI field in either a first DCI or a second DCI.

In one embodiment, the UE's behavior at slot n can be described as follows. In one example, if there is a PDSCH allocation at slot n that is scheduled by a first DCI transmitted at one previous slot, i.e., a PDSCH allocation at slot n scheduled through cross-slot scheduling method, the UE can assume to use the Rx beam that is calculated from the spatial QCL configuration indicated by TCI state signaled by N-bit TCI field in a first DCI to buffer the PDSCH symbols.

In another example, if there is no PDSCH allocation at slot n that is scheduled by some DCI transmitted at some previous slot. In such example, if there is a first CORESET configured to this UE at slot n, the UE can be requested to use the Rx beam that is calculated from the spatial QCL configuration indicated by the TCI state configured a first CORESET to buffer the potential PDSCH symbol.

Figure 13C:
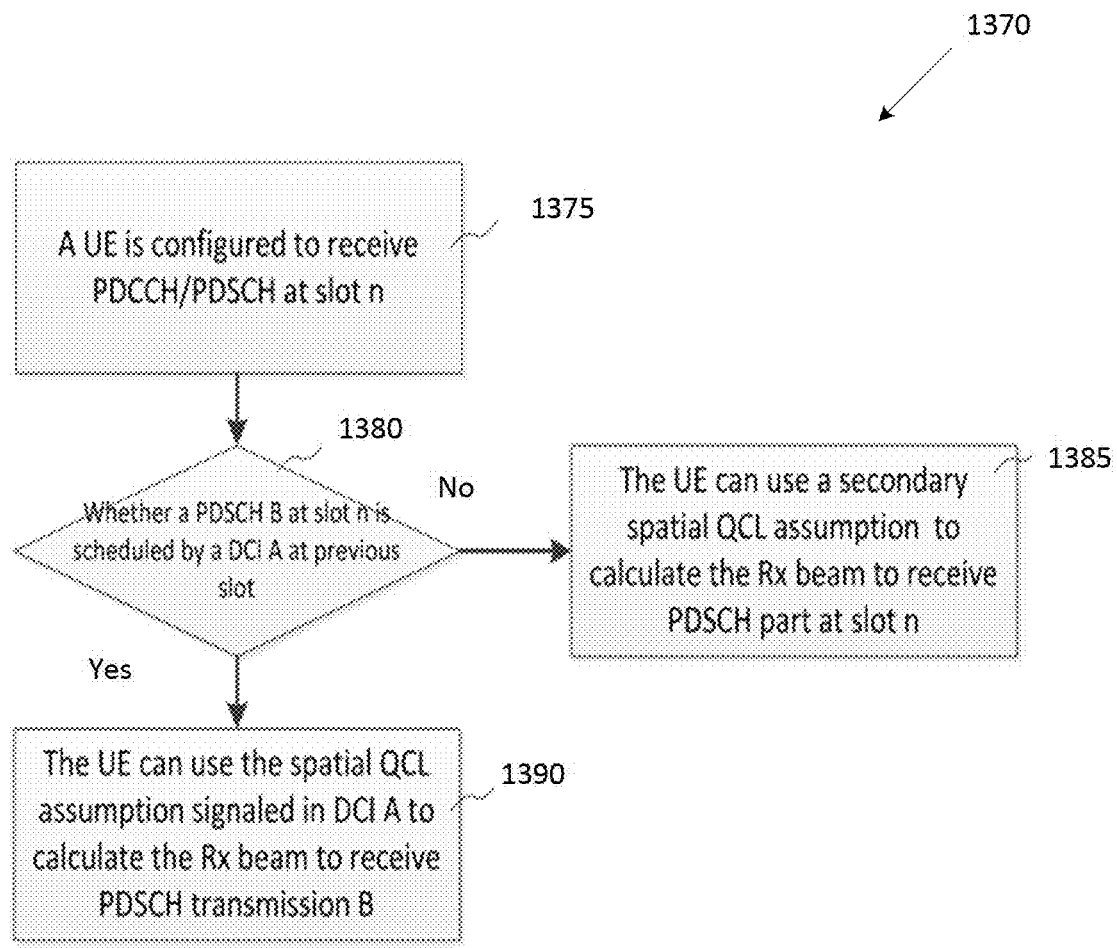
FIG. 13C illustrates another flow chart of a procedure for calculating Rx beam according to embodiments of the present disclosure.

FIG. 13C illustrates another flow chart of a procedure 1370 for calculating Rx beam according to embodiments of the present disclosure. The embodiment of the procedure 1370 illustrated in FIG. 13C is for illustration only. FIG. 13C does not limit the scope of this disclosure to any particular implementation.

At one slot n, if a DCI A at one previous slot schedules one PDSCH transmission at slot n, the UE can be requested to use the spatial QCL assumption signaled in DCI A to calculate the Rx beam that can be used to receive the PDSCH transmission at slot n. If at slot n, there is no PDSCH transmission being scheduled by DCI at one previous slot and the UE is configured to monitor the PDCCH at slot n, the UE can configured to use a configured secondary spatial QCL assumption to calculate the Rx beam that can be used to buffer/receive the PDSCH part at slot n.

An exemplary procedure is illustrated in FIG. 13C. A UE is configured to receive PDCCH and/or PDSCH at slot n in slot 1375. The UE can determine if a PDSCH B transmitted at slot n is scheduled by a DCI A at a previous slot in 1380. If a PDSCH B is scheduled at slot n by a DCI A at one previous slot, the UE can use be requested to use the spatial QCL assumption signaled in DCI A to calculate the Rx beam to receive PDSCH B in 1390. If no PDSCH transmission at slot n scheduled by a DCI A transmitted at a previous slot, the UE can be requested to use a configured secondary spatial QCL assumption to calculate the Rx beam that can be used to buffer/receive the PDSCH at slot n in 1385.

In one embodiment, a PDSCH can be divided into two parts in time domain. The first part of PDSCH contains the first one or more OFDM symbol and the second part of PDSCH contains the rest of the OFDM symbols. The UE can be configured to use the spatial QCL assumption information signaled in corresponding DCI to calculate the Rx beam that can be used to receive the second part of the PDSCH. The UE can be configured to use a first spatial QCL assumption to calculate the Rx beam that can be used to receive the first part of the PDSCH. One example of a first spatial QCL assumption can be the spatial QCL assumption that is configured for PDCCH reception. One example of a first spatial QCL assumption can be signaled by higher layer signaling, e.g., RRC signaling or MAC-CE.

Figure 14:
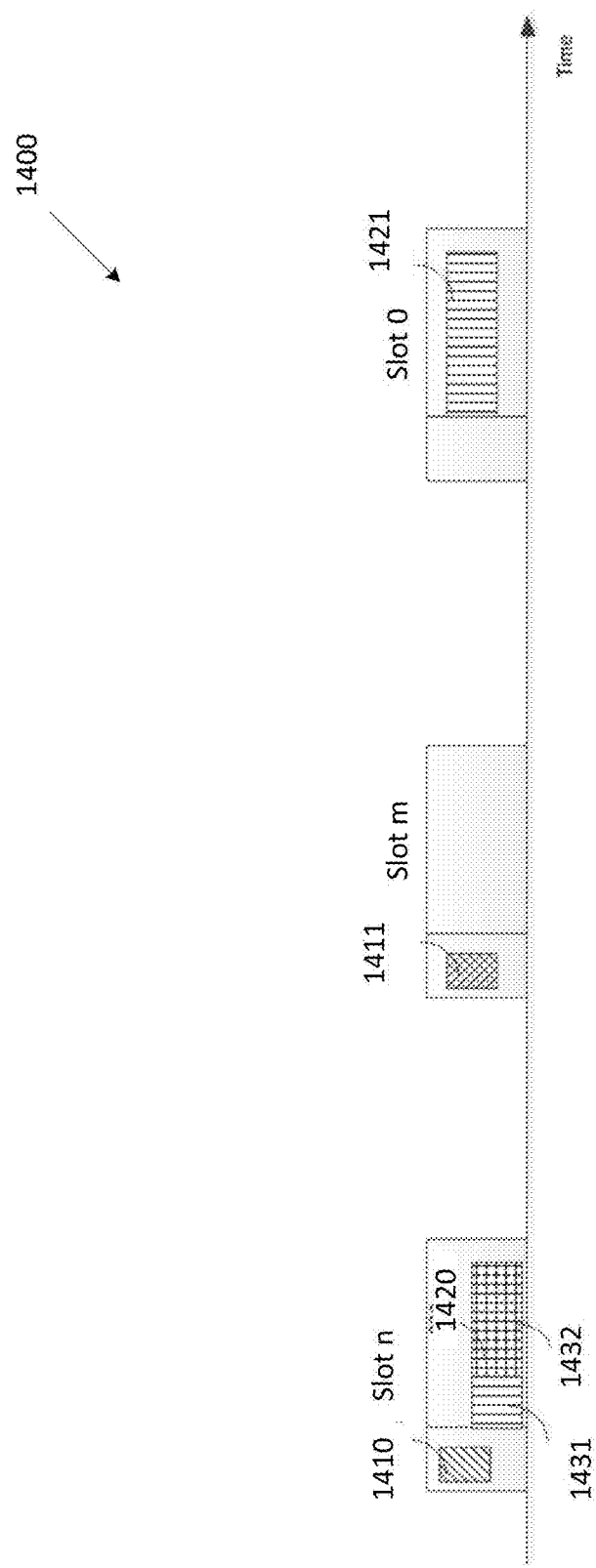
FIG. 14 illustrates another example Rx beam calculation based on the spatial QCL assumption signaled in DCI according to embodiments of the present disclosure.

FIG. 14 illustrates another example Rx beam calculation 1400 based on the spatial QCL assumption signaled in DCI according to embodiments of the present disclosure. The embodiment of the Rx beam calculation 1400 illustrated in FIG. 14 is for illustration only. FIG. 14 does not limit the scope of this disclosure to any particular implementation.

An example is shown in FIG. 14. At slot n, a DCI 1410 schedules a PDSCH 1420 at slot n. The PDSCH 1420 is divided into two parts in time domain. First part of PDSCH 1431 contains the first one or more OFDM symbols and the second part of PDSCH 1432 contains the rest of the OFDM symbols. The UE can be configured to use a first configured spatial QCL assumption to calculate the Rx beam that can be used to receive the first part of PDSCH 1431 and the UE can be configured to use the spatial QCL assumption signaled in DCI 1410 to calculate the Rx beam that can be used to receive the second part of PDSCH 1432.

In one embodiment, the UE can be configured to determine the scheme of calculating Rx beam based on whether the PDSCH transmission is same slot scheduled or cross-slot scheduled. If it is same-slot scheduling, the UE can be requested to calculate the Rx beam using the method as illustrated by 1410/1420/1431/1432 in FIG. 14. If it is cross-slot scheduling, the UE can be requested to use the spatial QCL assumption signaled in one DCI to calculate the Rx beam that can be used to receive the PDSCH being scheduled/allocated by the same DCI.

In the example shown in FIG. 14, a DCI 1411 at slot m schedules a PDSCH 1421 at slot o through cross-slot scheduling method. The UE can be requested to use the spatial QCL assumption signaled in DCI 1411 to calculate the Rx beam that can be used to receive the PDSCH 1421.

Figure 15:
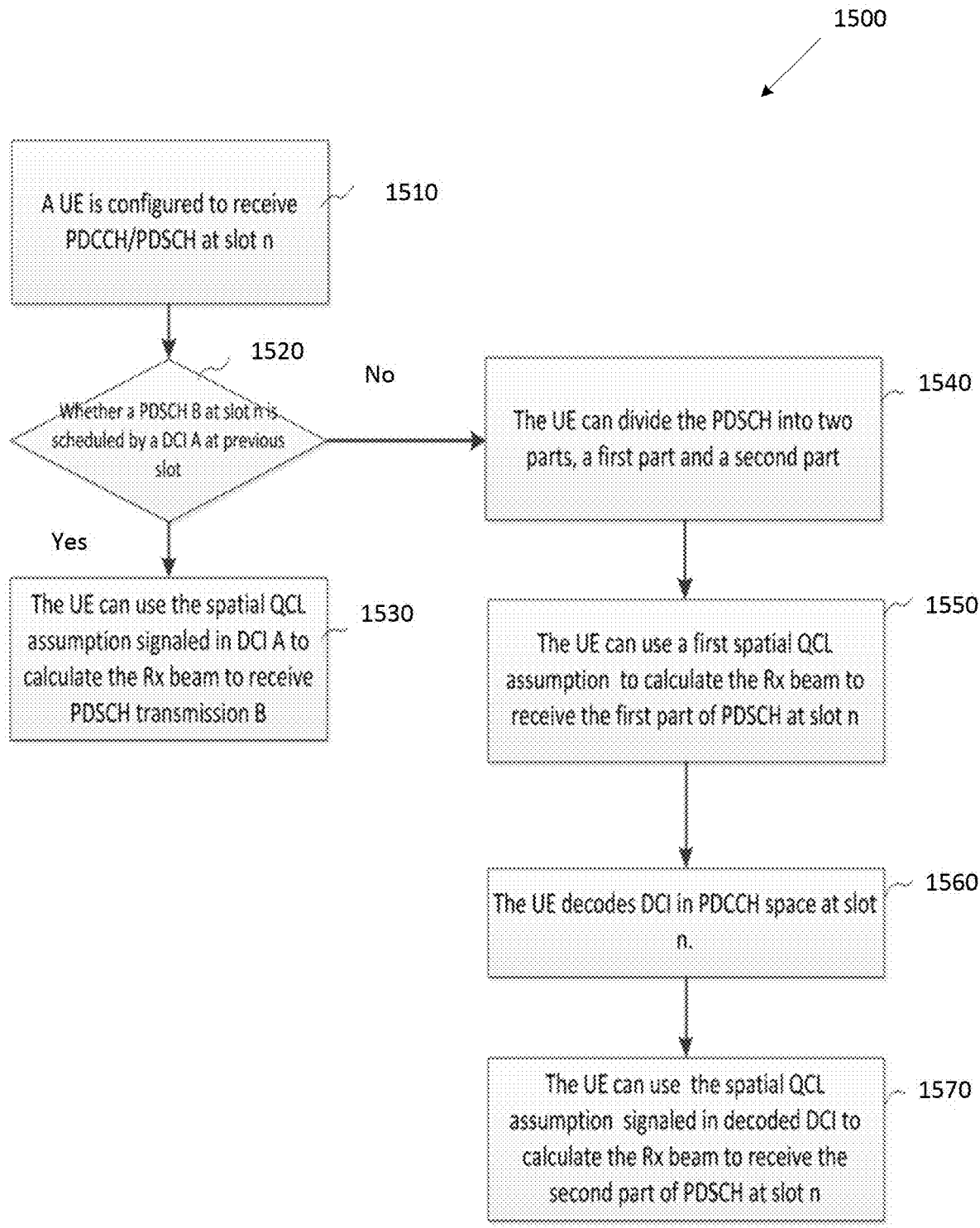
FIG. 15 illustrates yet another flow chart of a procedure for calculating Rx beam according to embodiments of the present disclosure.

FIG. 15 illustrates yet another flow chart of a procedure 1500 for calculating Rx beam according to embodiments of the present disclosure. The embodiment of the procedure 1500 illustrated in FIG. 15 is for illustration only. FIG. 15 does not limit the scope of this disclosure to any particular implementation.

An exemplary procedure is illustrated in FIG. 15. A UE is configured to receive PDCCH and/or PDSCH at slot n in 1510. The UE can determine whether a PDSCH B at slot n is scheduled by a DCI A transmitted at one previous slot in 1520. If yes, the UE can be requested to use the spatial QCL assumption signaled in DCI A to calculate Rx beam that can be used to receive PDSCH transmission B at slot n in 1530. If not, the UE can divide the PDSCH into two parts in time domain in 1540. The UE can use a first configured spatial QCL assumption to calculate the Rx beam that can be used to receive the first part of PDSCH in 1550. The UE can decode the DCI at slot n in 1560 and then use the spatial QCL assumption signaled in DCI to calculate the Rx beam that can be used to receive the second part of the PDSCH in 1570.

Figure 16:
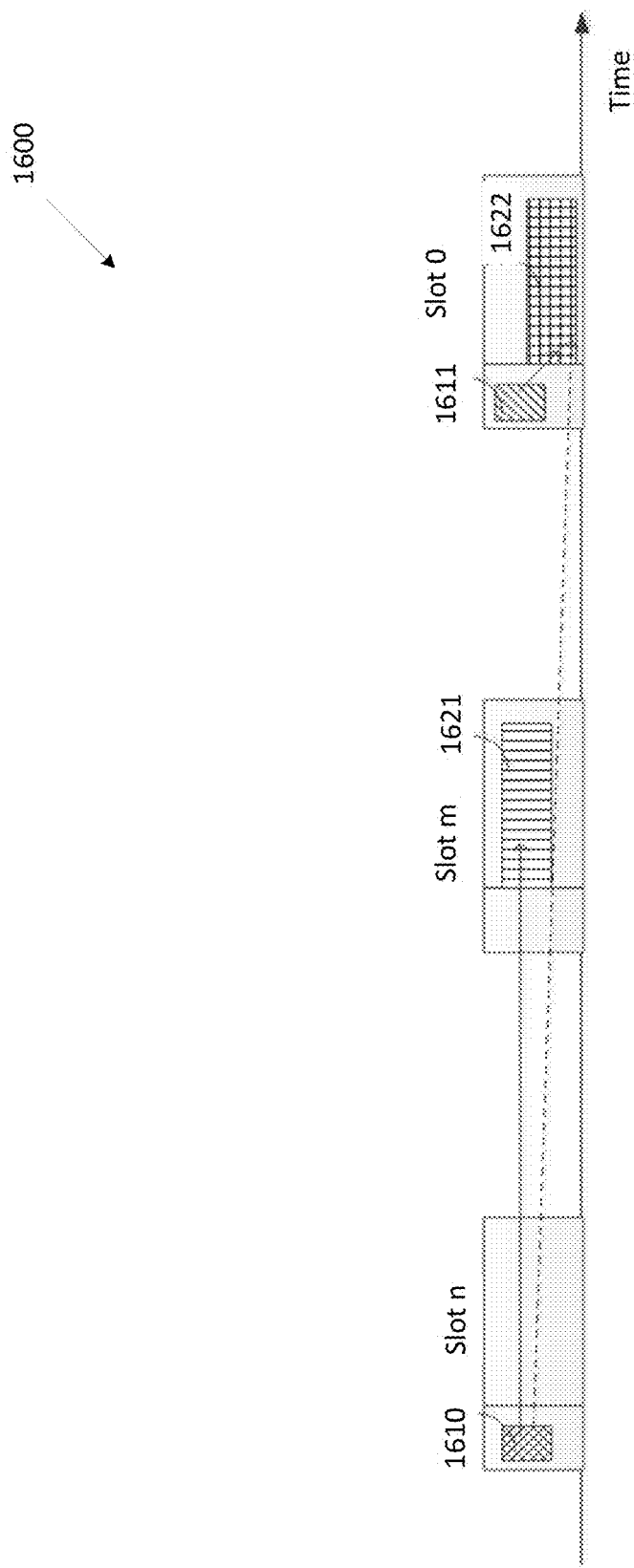
FIG. 16 illustrates yet another example Rx beam calculation based on the spatial QCL assumption signaled in DCI according to embodiments of the present disclosure.

FIG. 16 illustrates yet another example Rx beam calculation 1600 based on the spatial QCL assumption signaled in DCI according to embodiments of the present disclosure. The embodiment of the Rx beam calculation 1600 illustrated in FIG. 16 is for illustration only. FIG. 16 does not limit the scope of this disclosure to any particular implementation.

In one embodiment, the UE can be requested to use the spatial QCL assumption signaled by one previous DCI to calculate the Rx beam that can be used to receive the PDSCH that is scheduled by a DCI at the same slot (i.e., same-slot scheduling); and if it is cross-slot scheduling, the UE can be requested to use the spatial QCL assumption signaled by the corresponding DCI to calculate the Rx beam that is used to receive the PDSCH. An example is shown in FIG. 16.

As shown in FIG. 16, a DCI 1610 at slot n schedules a PDSCH transmission 1621 at slot m though cross-slot scheduling. The UE can use the spatial QCL assumption carried in DCI 1610 to calculate the Rx beam that can be used to receive the PDSCH transmission 1621. A DCI 1611 at slot o schedules a PDSCH transmission 1622 at the same slot o through same-slot scheduling. The DCI 1610 is the last one DCI that is received by the UE before DCI 1611. The UE can be requested to use the spatial QCL assumption carried in DCI 1610 to calculate the Rx beam that is used to receive the PDSCH transmission 1622.

Figure 17:
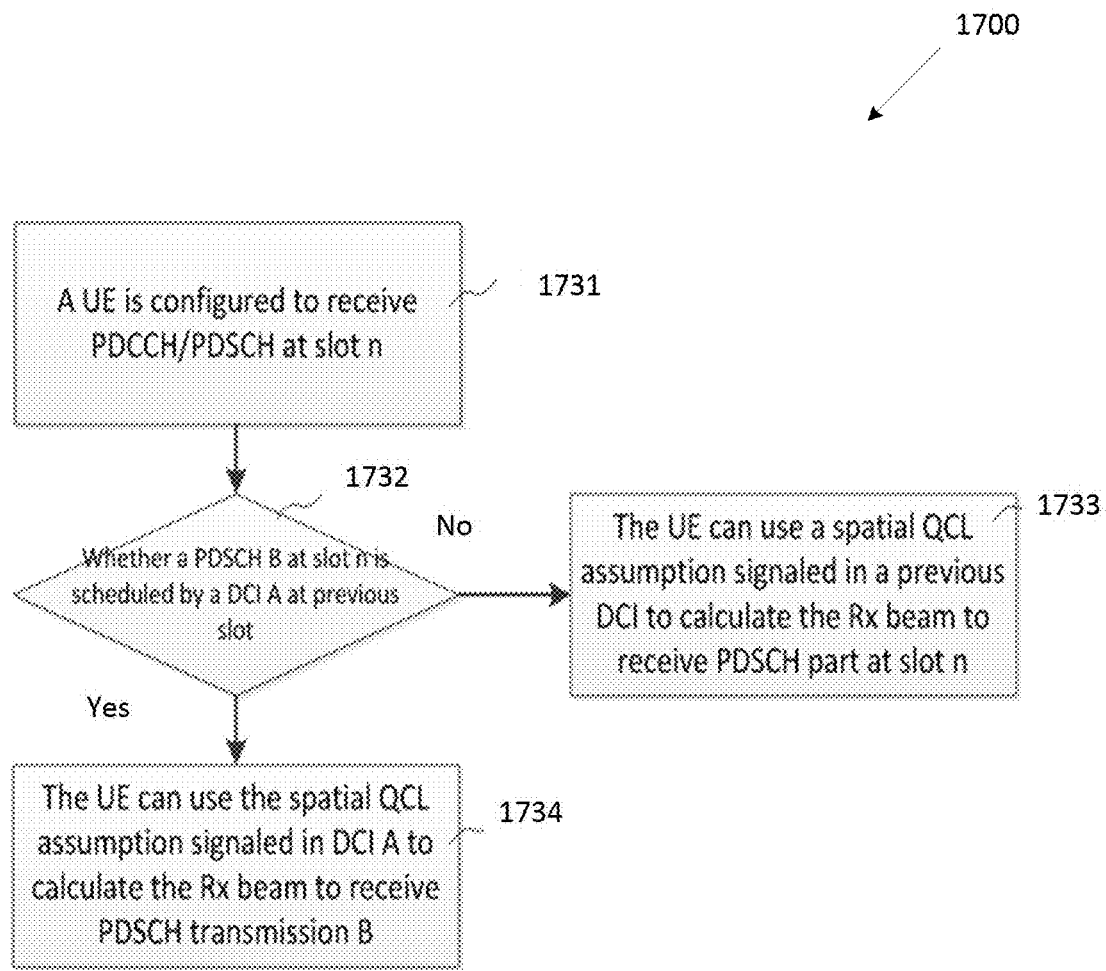
FIG. 17 illustrates yet another flow chart of a procedure for calculating Rx beam according to embodiments of the present disclosure.

FIG. 17 illustrates yet another flow chart of a procedure 1700 for calculating Rx beam according to embodiments of the present disclosure. The embodiment of the procedure 1700 illustrated in FIG. 17 is for illustration only. FIG. 17 does not limit the scope of this disclosure to any particular implementation.

An exemplary procedure is illustrated in FIG. 17. A UE is configured to receive PDCCH and/or PDSCH at slot n in 1731. The UE can determine if a PDSCH transmission B at slot n is allocated by a DCI A transmitted at a previous slot through cross-slot scheduling in 1732. If there is PDSCH transmission at slot n being allocated through cross-slot scheduling by a DCI A, the UE can use the spatial QCL assumption signaled in DCI A to calculate the Rx beam to receive the PDSCH transmission B in 1734. If there is no PDSCH transmission being allocated through cross-slot scheduling, the UE can use a spatial QCL assumption signaled in a previous DCI to calculate the Rx beam to receive the PDSCH transmission at slot n in 1733.

In one embodiment, a DCI can be used to signal the spatial QCL assumption for a UE to receive PDSCH transmission through a semi-static scheme. The UE can be configured to apply the spatial QCL assumption signaled in one DCI to one or more PDSCH transmitted in a particular time period after that DCI.

In one embodiment, a DCI sent at slot n can signal the spatial QCL assumption between DL RS antenna ports and DMRS antenna ports of PDSCH transmission that are allocated between slot $n+m_1$ and slot $n+m_1+N_1$. The UE can be requested to use the spatial QCL assumption signaled in DCI at slot n to calculate the Rx beam to receive the PDSCH allocated between slot $n+m_1$ and slot $n+m_1+N_1$. The value of $m_1$ and $N_1$ can be signaled in a DCI or higher layer signaling, e.g., RRC and/or MAC-CE signaling. The time duration between slot $n+m_1$ and slot $n+m_1+N_1$ can be defined as the valid time window for a spatial QCL assumption indication in DCI at slot n.

In one embodiment, a DCI carrying the spatial QCL assumption between DL RS antenna ports and DMRS antenna ports of PDSCH transmission can be sent at slot n and the UE can be requested to apply the spatial QCL assumption signaled in that DCI to PDSCH transmissions starting from slot $n+m_2$ until a new DCI carrying spatial QCL assumption is received.

In one embodiment, a UE can be configured with a first spatial QCL assumption through higher layer signaling, e.g., RRC or MAC-CE. A DCI sent at slot n can signal a spatial QCL assumption between DL RS antenna ports and DMRS antenna ports of PDSCH transmission. The UE can be configured to apply the spatial QCL assumption signaled in DCI sent at slot n to the PDSCH transmission within a configured valid time window for this DCI. One example of the valid time window can be the PDSCH transmission between slot $n+m_1$ and slot $n+m_1+N_1$.

If no new DCI containing spatial QCL assumption information is received by the UE within the valid time window of last DCI carrying spatial QCL assumption information, the UE can be requested to use a first spatial QCL assumption to calculate the Rx beam to receive the PDSCH transmission after slot $n+m_1+N_1$ until a new DCI carrying spatial QCL assumption information is received. If a new DCI A containing spatial QCL assumption information is received by the UE within the valid time window of last DCI carrying spatial QCL assumption information, the UE can be requested to use the spatial QCL assumption carried in DCI A to calculate the Rx beam to receive the PDSCH transmission within the valid time window of the new DCI A.

Figure 18:
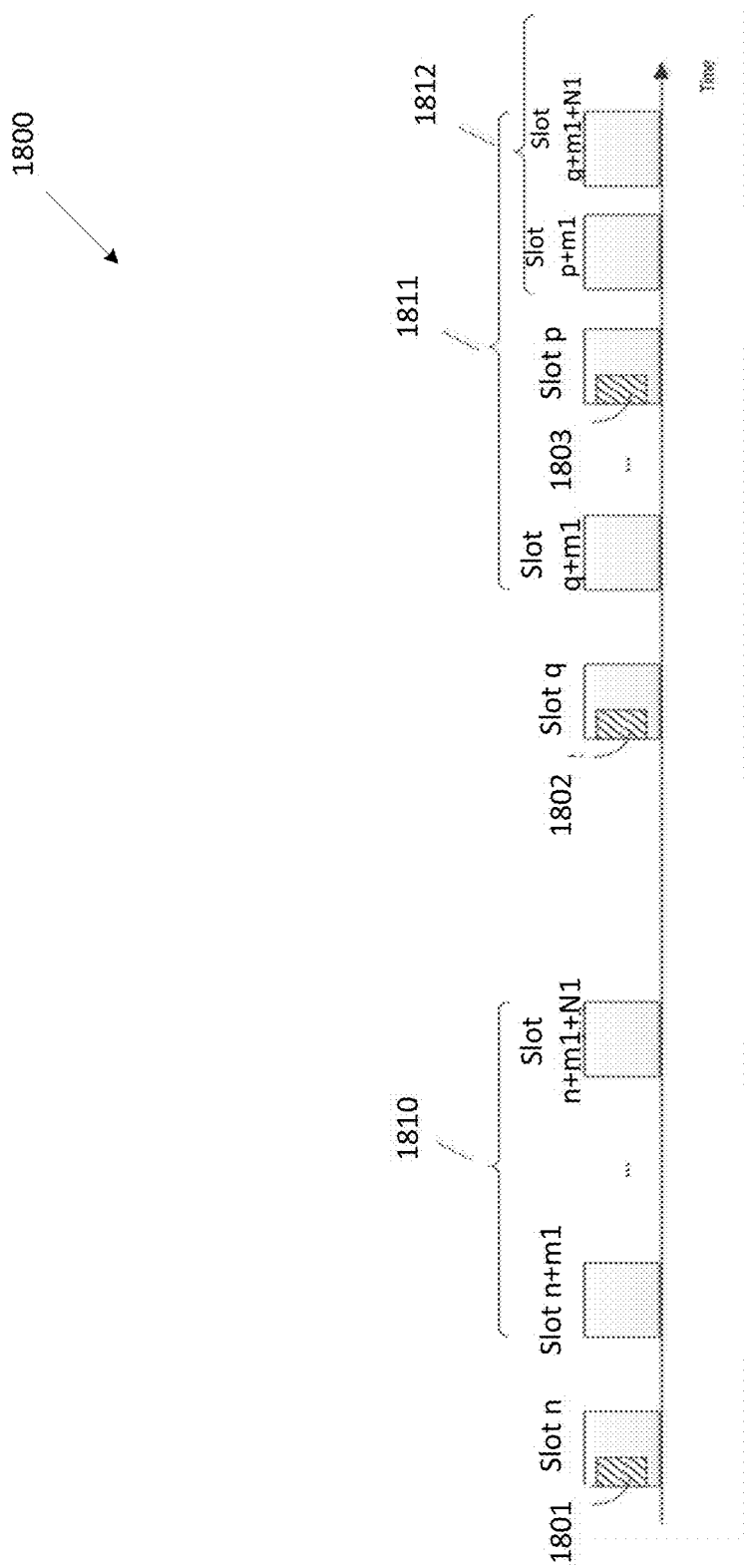
FIG. 18 illustrates yet another example Rx beam calculation based on the spatial QCL assumption signaled in DCI according to embodiments of the present disclosure.

FIG. 18 illustrates yet another example Rx beam calculation 1800 based on the spatial QCL assumption signaled in DCI according to embodiments of the present disclosure. The embodiment of the Rx beam calculation 1800 illustrated in FIG. 18 is for illustration only. FIG. 18 does not limit the scope of this disclosure to any particular implementation.

An example is illustrated in FIG. 18. A DCI 1801 carrying the spatial QCL assumption is received by a UE at slot n. The UE can be requested to use the spatial QCL assumption carried in DCI 1801 to calculate the Rx beam to receive the PDSCH transmission during the valid time window 1810, from slot $n+m_1$ to slot $n+m_1+N_1$. After slot n+m1+N1. A second DCI carrying the spatial QCL assumption information is received by the UE at slot q. Then the UE can be requested to use the spatial QCL assumption carried in DCI 1802 to calculate the Rx beam to receive the PDSCH transmission during the valid time window 1811, from slot $q+m_1$ to slot $q+m_1+N_1$.

Between slot $n+m_1+N_1$ and slot $q+m_1$, the UE can be configured to use a first spatial QCL assumption to calculate the Rx beam for the reception of PDSCH transmission. During the valid time window 1811 of spatial QCL assumption in DCI 1802, a DCI 1802 carrying spatial QCL assumption 1803 is received by the UE at slot p. The spatial QCL assumption 1803 carried in DCI 1802 can override the spatial QCL assumption carried in DCI 1802. The UE can be requested to use the spatial QCL assumption 1803 carried in DCI 1802 to calculate the Rx beam for reception of PDSCH transmission starting from slot $p+m_1$.

In one embodiment, one UE is configured with M transmission configuration indicator (TCI) states and each TCI state can be configured with one RS resource ID or more than one RS resource ID for the purpose of spatial QCL. If more than one RS resource IDs are configured in one TCI for the purpose of spatial QCL, the UE can be requested to apply the Rx beamforming that corresponds to the UE group based beam reporting in which those RS resource IDs are reported.

In one embodiment, one TCI state can be configured with one RS resource ID for spatial QCL purpose and one information element to indicate whether the spatial QCL of this RS resource ID is referred to UE-group based beam reporting or non-group based beam reporting. In one example, a first TCI states is configured with a first RS resource ID for spatial QCL purpose and the information element value indicating the spatial QCL of a first RS resource ID is referred to a UE-group based beam reporting, and a second TCI state is configured with a first RS resource ID for spatial QCL purpose and the information element value indicating the spatial QCL of a first RS resource ID is referred to a non UE-group-based beam reporting. One use case for that method is multi-TRP transmission. One UE can use different Rx beam to receive one same Tx beam when the downlink data is transmitted from a single TRP and multiple different TRPs.

In one embodiment, one TCI state can be configured with a RS set and two RS IDs in that RS set can be used for spatial QCL purpose. Both of these two RS IDs are used for spatial QCL configuration. When UE is configured with that TCI states for the spatial QCL for PDSCH or PDCCH, the UE may assume to use the Rx beam that correspond to the group-based beam reporting of those two RS IDs.

In one example, a first TCI can be configured with a first RS ID for spatial QCL, a second TCI state can be configured with a second RS ID for spatial QCL and a third TCI state can be configured with a first RS ID and a second RS ID for spatial QCL.

In one embodiment, one CSI-RS resource can be configured with a TCI state and the TCI state is used to indicate QCL configuration to receive that CSI-RS resource. In one example, a UE can be configured with a first CSI-RS resource through RRC signaling. In the configuration of that CSI-RS resource, a TCI state can be configured. When a first CSI-RS resource is transmitted, the UE can be requested to use the QCL configuration indicated by the associated TCI state to receive the transmission of a first CSI-RS resource for beam reporting and/or CSI reporting.

In one embodiment, one CSI-RS resource can be configured with L>1 TCIs states and each TCI state can be used to provide the QCL configuration for recovering that CSI-RS resource. Then when that CSI-RS resource is triggered, P-bits in the triggering message can be used to indicate one TCIs from L>1 configured TCIs states for the current triggered CSI-RS resource transmission and the UE can be requested to assume to use the QCL configuration indicated by the indicated TCI state in the triggering message to receive the transmission of that CSI-RS resource.

In one embodiment, a set of K>=1 CSI-RS resources can be configured to one UE and a TCI state can be configured to this CSI-RS set. When the UE is configured to receive/measure one or more CSI-RS resources in this set, the UE can be requested to use the QCL configuration indicated by that TCI state to receive and measure the transmission of one or more CSI-RS resources in that set for beam reporting and/or CSI reporting.

In one embodiment, a set of K>=1 CSI-RS resources can be configured to one UE and this CSI-RS resource set can be configured with L>1 TCIs states and each TCI state can be used to provide the QCL configuration for recovering any CSI-RS resource in this set. Then when that one or more CSI-RS resources in this set is triggered, P-bits in the triggering message can be used to indicate one TCIs from L>1 configured TCIs states for the current triggered CSI-RS resource transmission and the UE can be requested to assume to use the QCL configuration indicated by the indicated TCI state in the triggering message to receive the transmission of those CSI-RS resources.

In one embodiment, one DCI can be used to schedule a PDSCH transmission and also trigger the transmission of one or more CSI-RS resources. The N-bit TCI field in that DCI used to indicate spatial QCL configuration for the scheduled PDSCH can be used to indicate the spatial QCL configuration for the triggered transmission of CSI-RS resources by the same DCI. In one method, a UE receives a first DCI. A first DCI schedules a second PDSCH and triggers the transmission of a third CSI-RS resource. The UE can be requested to assume that both scheduled PDSCH DMRS and triggered CSI-RS are QCL with the DL RS(s) in the RS set corresponding to the signaled TCI state by N-bit TCI field in that DCI.

In one embodiment, when one DCI triggers the transmission of CSI-RS transmission in the same slot, the UE can be request to assume use the QCL configuration configured to the CORESET where the DCI is received to receive and measure the CSI-RS transmission.

In one embodiment, a UE can be configured with one CSI-RS resource configured with one TCI state for the purpose of QCL configuration. A triggering message can also signal one TCI state when one CSI-RS resource is triggered to dynamically indicate the QCL configuration for the triggered CSI-RS resource transmission. In one example, a first CSI-RS resource can be configured to a UE and a first TCI state can be configured for a first CSI-RS resource by high layer signaling. When a first CSI-RS resource is triggered, the UE can be requested to assume to use a first TCI state as the QCL configuration to receive and measure the transmission of a first CSI-RS resource. When a first CSI-RS resource is triggered and a second TCI state is signaled by the triggering message, the UE can be requested to apply the QCL indication contained in a second TCI state to receive and measure the transmission of a first CSI-RS resource.

In one embodiment, one UE is configured with M transmission configuration indicator (TCI) states and each TCI state can be configured with one RS resource ID or more than one RS resource ID for the purpose of spatial QCL and a first subset of TCI states can be configured a first CORESET. The UE can be requested to assume that a PDSCH scheduled by a DCI transmitted in a first CORESET would be QCLed to the QCL configuration indicated by one TCI state in a first subset. In one method, a UE can be configured with M TCI states. The UE can be configured with a first CORESET. A subset of K TCI states among those M TCI states, $\{T_{i1}, T_{i2}, T_{i3}, \ldots, T_{iK}\}$, can be configured for a first CORESET.

The UE can be requested to assume the DMRS in any PDSCH transmission scheduled by a DCI sent in a first CORESET may be QCLed to one or more RS IDs contained in one TCI states among the subset $\{T_{i1}, T_{i2}, T_{i3}, \ldots, T_{iK}\}$. A N-bit TCI field in the DCI can be used to indicate the index of one TCI states in this configured subset $\{T_{i1}, T_{i2}, T_{i3}, \ldots, T_{iK}\}$. In one example, the value of N-bit TCI field in the DCI in a first CORSET can be mapped to TCI subset $\{T_{i1}, T_{i2}, T_{i3}, \ldots, T_{iK}\}$ as shown in TABLE 1 for N=3 and K=4.

TABLE 1

The value of N-bit TCI field in the DCI in a first CORSET

| The value of N-bit TCI in DCI in a first CORESET | The TCI state |
|---|---|
| 0x000 | $T_{i1}$ |
| 0x001 | $T_{i2}$ |
| 0x010 | $T_{i3}$ |
| 0x011 | $T_{i4}$ |

In one embodiment, a subset of TCI states $\{T_{i1}, T_{i2}, T_{i3}, \ldots, T_{iK}\}$ can be configured for one CORESET to one UE. One given TCI state in this subset can be configured as the QCL configuration for PDCCH transmission in this CORESET and the TCI states in this subset can be candidate TCI states which would be used to indicate the QCL configuration for PDSCH transmissions that are scheduled by the DCI transmitted in that CORESET. In one example, if K=1, $T_{i1}$ is the TCI state configured to indicate the QCL configuration for that CORESET and then no N-bit TCI field may be present in the DCI sent in that CORESET and for any PDSCH scheduled by the DCI sent in that CORESET, the DMRS in those PDSCH can be assumed to be spatial QCLed to the TCI state configured for that CORESET.

In one embodiment, the value of N for N-bit TCI field in DCI is configurable per CORESET. If the value of N is zero for one CORESET, then no N-bit TCI field may be present in all the DCIs sent in that CORESET and for all the PDSCH scheduled by the DCI sent in that CORSET, the DMRS in those PDSCH can be assumed to be spatial QCLed to the TCI state configured for that CORESET.

In one embodiment, the PDSCH scheduled by DL DCI format 1_0 (i.e. DL fallback DCI) may assume a spatial QCL assumption that is not indicated by the TCI filed in DCI. For a PDSCH scheduled by DL DCI format 1_0 (i.e., DL fallback DCI), the UE may assume the antenna ports of one DM-RS port group of PDSCH are quasi co-located based on the TCI state used for PDCCH quasi-colocation indication of the CORESET. One CORESET can be configured or indicated with one TCI (transmission configuration indication) for quasi-colocation indication.

In one example, For a PDSCH scheduled by DL DCI format 1_0 (i.e., DL fallback DCI), the UE may assume the antenna ports of one DM-RS port group of PDSCH are quasi co-located based on the TCI state that is configured by some higher layer signaling or a special TCI state, for example TCI states 000. The TCI state 000 can be the TCI state among those 2^N TCI states activated for PDSCH. The TCI state 000 can be the first TCI state among those M TCI states configured for the UE in RRC.

With semi-persistent PDSCH transmission, the UE can be pre-configured by the NW with an SPS-RNTI and a periodicity. Once pre-configured, a DCI with SPS-RNTI can be used to activate and allocate the semi-persistent PDSCH allocation that is repeated according to the pre-configured periodicity until an explicit deactivation signal is received or pre-configured inactivity timer is expired.

In one embodiment, the DCI that activates one semi-persistent PDSCH transmission can signal a spatial QCL assumption between downlink RS and the DMRS antenna ports of all PDSCH transmission in the allocated semi-persistent PDSCH transmission. The UE can be configured to use the spatial QCL assumption signaled in one DCI allocating a semi-persistent PDSCH transmission to calculate the Rx beam that is used to receive all the PDSCH transmission corresponding to scheduled semi-persistent PDSCH transmission.

FIG. 19 illustrates yet another example Rx beam calculation 1900 based on the spatial QCL assumption signaled in DCI according to embodiments of the present disclosure. The embodiment of the Rx beam calculation 1900 illustrated in FIG. 19 is for illustration only. FIG. 19 does not limit the scope of this disclosure to any particular implementation.

An example is illustrated in FIG. 19. A DCI 1901 is received by the UE to allocate a semi-persistent PDSCH transmission. Based on pre-configured semi-persistent configuration and DCI, the PDSCH of this semi-persistent PDSCH transmission is transmitted at slot m, slot m+p, slot m+2×p and until slot m+L×p when an explicit deactivation signal is received or a pre-configured inactivity timer is expired, where p is the pre-configured semi-persistent PDSCH transmission periodicity.

The spatial QCL assumption information can be signaled in DCI 1901 for the semi-persistent PDSCH transmission. The UE can be configured to use the spatial QCL assumption in DCI 1901 to calculate the Rx beam that is used to receive all the PDSCH transmission within this semi-persistent PDSCH, including PDSCH 1910 at slot m, PDSCH 1911 at slot m+p, PDSCH 1912 at slot m+2×p and PDSCH 1913 at slot m+L×p.

In one embodiment, higher layer signaling (RRC or MAC-CE signaling) can be used to configure the spatial QCL assumption for a semi-persistent PDSCH transmission.

During a semi-persistent PDSCH transmission, any HARQ retransmission for one PDSCH transmission may be separately scheduled using dynamic scheduling through a dedicate DCI. In one example, the UE can be requested to apply the spatial QCL assumption signaled in the DCI scheduling the semi-persistent PDSCH transmission to a HARQ retransmission for one PDSCH transmission of that semi-persistent PDSCH transmission.

In one example, the UE can be requested to apply the spatial QCL assumption signaled in the DCI scheduling this dynamic HARQ PDSCH retransmission.

In one example, the UE can choose between the spatial QCL assumption signaled by DCI scheduling the semi-persistent transmission and by the DCI scheduling the dynamic HARQ retransmission for the HARQ retransmission based whether the scheduling for the HARQ retransmission is same-slot or cross-slot scheduling. If the HARQ retransmission is allocated through same-slot scheduling, the UE can be configured to use the spatial QCL assumption information signaled in the DCI scheduling the semi-persistent transmission on the dynamically schedule HARQ retransmission. If the HARQ retransmission is allocated through cross-slot scheduling, the UE can be configured to use the spatial QCL assumption information signaled in the DCI allocating this HARQ retransmission to calculate the Rx beam for reception of the HARQ PDSCH transmission.

FIG. 20 illustrates yet another example Rx beam calculation 2000 based on the spatial QCL assumption signaled in DCI according to embodiments of the present disclosure. The embodiment of the Rx beam calculation 2000 illustrated in FIG. 20 is for illustration only. FIG. 20 does not limit the scope of this disclosure to any particular implementation.

In one embodiment, a DCI carrying the spatial QCL assumption information can be used to override the Rx beam configured by the DCI allocating the semi-persistent PDSCH transmission. An example is illustrated in FIG. 20.

A DCI 2001 is received by the UE to allocate a semi-persistent PDSCH transmission. Based on pre-configured semi-persistent configuration and DCI, the PDSCH of this semi-persistent PDSCH transmission is transmitted at slot m, slot m+p, slot m+2×p and until slot m+L×p when an explicit deactivation signal is received or a pre-configured inactivity timer is expired, where p is the pre-configured semi-persistent PDSCH transmission periodicity. The spatial QCL assumption information can be signaled in DCI 2001 for the semi-persistent PDSCH transmission.

The UE can be configured to use the spatial QCL assumption in DCI 2001 to calculate the Rx beam that is used to receive all the PDSCH transmission within this semi-persistent PDSCH, including PDSCH 2010 at slot m, PDSCH 2011 at slot m+p, PDSCH 2012 at slot m+2×p and PDSCH 2013 at slot m+L×p. At slot q, a DCI 2002 with the spatial QCL assumption is received. Then the UE can be requested to use the spatial QCL assumption signaled in DCI 2002 to override the spatial QCL assumption signaled in DCI 2001. The UE can use the spatial QCL assumption in DCI 2002 to calculate the Rx beam used to receive PDSCH 2012 at slot m+2×p until PDSCH 2013 at slot m+L×p.

In one embodiment, a UE can be requested to report some UE capability information on receive beam and DIC decoding to the TRP to assist the TRP to decide the scheduling of PDCCH and the UE's corresponding PDSCH. The information a UE reported can include one or more of the followings: the number of receive analog beams that UE have can be used to receive downlink transmission; the number of receive analog beams that UE have can be used to receive downlink control channel, e.g., PDCCH; the number of receive analog beams that the UE have can be used to receive downlink data channel, e.g., PDSCH; whether the UE use one fixed beam to receive downlink transmission; the time duration required by the UE to finish DCI decoding and obtain the beam indication information contained in DCI; and whether the UE can support same-slot beam indication or not.

In one embodiment, a UE can be requested to report the information on which UE receives analog beams. In one example, the UE can be requested to report whether the UE chooses receive beam from more than one analog beams to receive the downlink transmission or the UE uses a fixed analog beam to receive the downlink transmission. The UE can be requested to report one-bit information to indicate such information. For example the value of one-bit being 0 can indicate that the UE uses a fixed analog beam to receive the downlink transmission and the value of one-bit being 1 can be indicate that the UE needs to select one beam from multiple beams to receive the downlink transmission.

In one embodiment, the UE can be requested to report whether the UE needs spatial QCL indication for downlink transmission in the report of UE capability. If the UE reports that he does not need spatial QCL indication for downlink transmission, the UE can assume to choose to ignore the spatial QCL configuration signaled by the NW. If the UE reports that he does need spatial QCL indication for downlink transmission, the UE can be requested to follow the spatial QCL configuration signaled by the NW providing a reference to a TCI state to calculate the Rx beam for downlink reception.

In one embodiment, the UE can be requested to report whether the UE needs spatial QCL indication for PDSCH transmission, for example as part of UE capability report. If the UE reports that he does not need spatial QCL indication for PDSCH transmission, the UE can assume no TCI (transmission configuration indication) filed in DCI; if the TCI filed is present in the DCI, the UE can assume to choose to ignore the TCI field. If the UE reports that he does need spatial QCL indication for PDSCH transmission, the UE can assume TCI field can be present in DCI and the UE can be requested to use the TCI field present in DCI to calculate the Rx beamforming for receiving PDSCH.

In one embodiment, the UE can be requested to report whether the UE needs spatial QCL indication for PDCCH transmission, for example as part of UE capability report. If the UE reports that he does not need spatial QCL indication for PDCCH transmission, the UE can assume no TCI (transmission configuration indication) filed in QCL configuration signaling for PDCCH; If the TCI filed is present in the QCL configuration signaling for PDCCH, the UE can assume to choose to ignore the TCI field. If the UE reports that he does need spatial QCL indication for PDCCH transmission, the UE can assume TCI field can be present in QCL configuration signaling for PDCCH and the UE can be requested to use the TCI field present in QCL configuration signaling for PDCCH to calculate the Rx beamforming for receiving PDCCH.

In one example, the UE can be requested to report the number of analog beams that the UE may select for the reception of downlink transmission. For example, the UE can report an N-bit value to indicate the number of available beams. For example, the UE can be requested to report 2-bit information to indicate the number of beams. The value of 2-bit being 00 can indicate that the UE uses one fixed analog beam; the value of 2-bit being 01 can indicate that the UE has 2 available analog beams; the value of 2-bit being 10 can indicate that the UE has 3 available analog beams; the value of 2-bit being 11 can indicate that the UE has 4 or more than 4 available analog beams.

In one example, each value of N-bit payload reported by the UE can indicate a range of number of UE Rx beams. For example, the value of 2-bit reporting can indicate the number of Rx beam as illustrated in TABLE 2 and TABLE 3.

TABLE 2

| The value of 2-bit reporting | |
|---|---|
| The value of 2-bit reporting | The number of Rx beams: P |
| 00 | 0 |
| 01 | $1 \leq P \leq 2$ |
| 10 | $3 \leq P \leq 4$ |
| 11 | $P > 4$ |

TABLE 3

| The value of 2-bit reporting | |
|---|---|
| The value of 2-bit reporting | The number of Rx beams: P |
| 00 | 0 |
| 01 | $1 \leq P \leq 2$ |
| 10 | $3 \leq P \leq 8$ |
| 11 | $P > 8$ |

The aforementioned embodiment may be useful for TRP in various use cases. One use case is that the TRP can determine whether beam indication is needed or not for the downlink transmission, e.g., PDCCH and PDSCH. If a UE indicates that only one fixed beam would be used for downlink reception, then the TRP can omit the beam indication to that UE. Another use case is that the TRP can determine the CSI-RS configuration for beam management to support proper Rx beam sweeping capability based on the number Rx beams.

In one embodiment, a UE can be requested to report the capability of UE receive analog beam for PDCCH and PDSCH separately. A UE can have different receive analog beam capability to receive downlink control channel PDCCH and data channel PDSCH. The Rx beam pool for PDCCH can be less number of wide beams while the Rx beam pool for PDSCH is more number of narrow beams. A UE can use one fixed analog beam to receive the PDCCH and select one beam from multiple narrow beams for the PDSCH reception. Requesting a UE to report the Rx beam capability information separately for control channel and data channel can be useful.

In one embodiment, a UE can be requested to report the information of capability of beam indication decoding. In one example, a DCI for a UE is sent on symbol #0 and the UE can finish the decoding that DCI and obtain the beam indication information in that DCI within T time after symbol #0. The T time can be measured by the number of OFDM symbol with a reference OFDM symbol length or reference numerology. The T time can be measured by the value of milliseconds. In one example, a UE can be requested to an N-bit payload to indicate the T time in terms of number symbols. For example, a 2-bit payload can be reported by the UE. The value of that 2-bit payload can indicate the number of OFDM symbols that the UE needs to finish decoding the DCI and then obtain the Rx beam indication information contained in the DCI.

In one example, the UE can be requested to report the capability of receiving same-slot beam indication for PDSCH. The DCI transmitted at slot n can schedule one PDSCH at slot n. If the UE can decode the DCI and obtain the Rx beam indication contained in DCI quickly enough, then the TRP can use the DCI to indicate the Rx beam information for the PDSCH scheduled at the same slot. The UE can be requested to report one-bit to indicate whether the UE can support same-slot beam indication in DCI for PDSCH or not. The value of one-bit being 0 can indicate that the UE cannot support same slot beam indication in DCI for PDSCH scheduled at the same slot and the value of one bit being 1 can indicate that the UE can support same slot beam indication in DCI for PDSCH scheduled at the same slot. In one example, the presence/absence of one field can indicate whether the UE can support same slot beam indication or not.

In one embodiment, the UE can be configured with M candidate transmission configuration indication (TCI) states for the purpose of QCL indication. One TCI can be associated with one RS set. In one example, one RS setting is configured with one TCI state. In one example, one RS setting has multiple RS sets (e.g., multiple CSI-RS resource sets) and one TCI state can be configured with one RS set. If one TCI state is configured with one RS setting or RS set, the UE can be requested to assume that the DL RS for the purpose of spatial QCL signaled by N-bit TCI filed in DCI for PDSCH may be chosen from the corresponding RS setting or RS set configured for that TCI state. If the DL RS signaled by N-bit TCI field in DCI for PDSCH is not chosen from the corresponding RS setting or RS set configured for that TCI state, the UE can assume to ignore the that TCI field. The same rule can be applied to the QCL configuration for PDCCH.

In one embodiment, M TCI states can be configured through RRC. MAC-CE signaling can be used to signal/activate a subset of configured TCI states to the UE and the UE can be requested to assume the N bits in DCI is the index of one TCI state in the activated subset of TCI state.

In one embodiment, one TCI state can be associated with one RS set, in which there can be more than one RS IDs. When one UE receives a TCI state associated with one RS set with more than one RS IDs is signaled through N-bit TCI field in one DCI, the UE can be requested to calculate the spatial QCL configuration based on one or more of the RS IDs included in the associated RS sets. In one example, a first TCI state can be associated with a first RS set. In a first RS set, there are two RS IDs, a first RS ID and a second RS ID. When the UE receive one DCI and this DCI contains N-bit TCI field and this TCI field indicates a first TCI state, the UE can be requested to calculate the spatial QCL configuration based on one of the followings.

In one example, if a first RS ID and a second RS ID are reported together in a same beam reporting instance by the UE group-based beam reporting, the UE can be requested to assume the spatial QCL configuration indicated by a first TCI state signaled to be the Rx beam that corresponds to the beam pair of {a first RS ID, a second RS ID} through UE group-based beam reporting.

In another example, if a first RS ID and a second RS ID are not reported together in a same beam reporting instance by the UE group-based beam reporting.

In yet another example, if the a first RS ID has more latest beam reporting than a second RS ID, the UE can be requested to assume the spatial QCL configuration indicated by a first TCI state signaled here to be the Rx beam that correspond to a first RS ID.

In yet another example, if the a second RS ID has more latest beam reporting than a first RS ID, the UE can be requested to assume the spatial QCL configuration indicated by a first TCI state signaled here to be the Rx beam that correspond to a second RS ID.

In yet another example, if a first RS ID and a second RS ID are not reported together in a same beam reporting instance by the UE group-based beam reporting, the UE can be requested to assume the spatial QCL configuration indicated by a first TCI state signaled here to be the Rx beam that correspond to a first RS ID.

In yet another example, if a first RS ID and a second RS ID are not reported together in a same beam reporting instance by the UE group-based beam reporting, the UE can be requested to assume the spatial QCL configuration indicated by a first TCI state signaled here to be the Rx beam that correspond to a second RS ID.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:
1. A user equipment (UE) for a beam indication in a wireless communication system, the UE comprising:
 a transceiver configured to receive, from a base station (BS), downlink control information (DCI) including scheduling information for a data transmission on a downlink data channel, wherein the DCI includes an index of a spatial quasi-co-location (QCL) configuration; and a processor operably connected to the transceiver, the processor configured to:
compare a time offset between the data transmission and the DCI with a threshold that is pre-configured at the UE,
calculate a receive (Rx) beam based on the index of the spatial QCL configuration or a pre-configured spatial QCL assumption, wherein one of the spatial QCL configuration or a pre-configured spatial QCL assumption is selected based on the time offset between the DCI and the data transmission on the downlink data channel,
wherein the transceiver is further configured to receive the data transmission based on the time offset.

2. The UE of claim 1, wherein the processor is further configured to:
calculate the Rx beam based on the spatial QCL configuration indicated in the DCI when the time offset is larger than or equal to the threshold,
calculate the Rx beam based on the pre-configured spatial QCL assumption when the time offset is less than the threshold, and
wherein the transceiver is further configured to receive the data transmission using the calculated Rx beam.

3. The UE of claim 1, wherein the processor is further configured to:
apply, a spatial QCL assumption from a transmission configuration indication (TCI) state signaled by an N-bit TCI field included in the DCI for receiving the data transmission when the time offset is equal to or greater than the threshold, and
apply the pre-configured spatial QCL assumption for receiving the data transmission when the time offset is less than the threshold.

4. The UE of claim 3, wherein the pre-configured spatial QCL assumption is identical to the spatial QCL configuration included in the TCI state that is configured to a downlink control channel of a lowest control resource set-identification (CORESET-ID) in a latest slot that one or more CORESETs are configured at the UE.

5. The UE of claim 3, wherein at least one antenna port of demodulation-reference signal (DM-RS) port group of the downlink data channel is QCLed with an RS set included in a set of QCL parameters provided by the TCI state.

6. The UE of claim 5, wherein, when the downlink data channel is scheduled by a DCI format 1_0, the TCI state for the downlink data channel is identical to a TCI state configured to a CORESET of downlink control channel scheduling the downlink data channel.

7. A base station (BS) for a beam indication in a wireless communication system, the BS comprising:
a transceiver configured to:
transmit, to a user equipment (UE), downlink control information (DCI) including scheduling information for a data transmission on a downlink data channel, wherein the DCI includes an index of a spatial quasi-co-location (QCL) configuration, and
transmit the data transmission using a receive (Rx) beam based on a time offset, wherein the time offset between the data transmission and the DCI is calculated based on a threshold that is pre-configured at the UE, and
wherein the Rx beam is calculated based on the index of the spatial QCL configuration or a pre-configured spatial QCL assumption at the UE, and
wherein one of the spatial QCL configuration or a pre-configured spatial QCL assumption is selected based on the time offset between the DCI and the data transmission on the downlink data channel.

8. The BS of claim 7, wherein the Rx beam is further calculated based on the spatial QCL configuration indicated in the DCI when the time offset is larger than or equal to the threshold and the Rx beam is further calculated based on the pre-configured spatial QCL assumption when the time offset is less than the threshold, and wherein the transceiver is further configured to transmit the data transmission using the calculated Rx beam.

9. The BS of claim 8, wherein:
a spatial QCL assumption from a transmission configuration indication (TCI) state signaled by an N-bit TCI field included in the DCI is applied, by the UE, for receiving the data transmission when the time offset is equal to or greater than the threshold, and
the pre-configured spatial QCL assumption is applied, by the UE, for receiving the data transmission when the time offset is less than the threshold.

10. The BS of claim 9, wherein the pre-configured spatial QCL assumption is identical to the spatial QCL configuration included in the TCI state that is configured to a downlink control channel of a lowest control resource set-identification (CORESET-ID) in a latest slot that one or more CORESETs are configured at the UE.

11. The BS of claim 9, wherein at least one antenna port of demodulation-reference signal (DM-RS) port group of the downlink data channel is QCLed with an RS set included in a set of QCL parameters provided by the TCI state.

12. The BS of claim 11, wherein, when the downlink data channel is scheduled by a DCI format 1_0, the TCI state for the downlink data channel is identical to a TCI state configured to a CORESET of downlink control channel scheduling the downlink data channel.

13. A method of a user equipment (UE) for a beam indication in a wireless communication system, the method comprising:
receiving, from a base station (BS), downlink control information (DCI) including scheduling information for a data transmission on a downlink data channel, wherein the DCI includes an index of a spatial quasi-co-location (QCL) configuration;
comparing a time offset between the data transmission and the DCI with a threshold that is pre-configured at the UE;
calculating a receive (Rx) beam based on:
the index of the spatial QCL configuration or a pre-configured spatial QCL assumption, and
the time offset between the DCI and the data transmission on the downlink data channel; and
receiving the data transmission based on the time offset.

14. The method of claim 13, further comprising:
calculating the Rx beam based on the spatial QCL configuration indicated in the DCI when the time offset is larger than or equal to the threshold;
calculating the Rx beam based on the pre-configured spatial QCL assumption when the time offset is less than the threshold; and
receiving the data transmission using the calculated Rx beam.

15. The method of claim 13, further comprising:

applying, a spatial QCL assumption from a transmission configuration indication (TCI) state signaled by an N-bit TCI field included in the DCI for receiving the data transmission when the time offset is equal to or greater than the threshold; and applying the pre-configured spatial QCL assumption for receiving the data transmission when the time offset is less than the threshold.

16. The method of claim 15, wherein the pre-configured spatial QCL assumption is identical to the spatial QCL configuration included in the TCI state that is configured to a downlink control channel of a lowest control resource set-identification (CORESET-ID) in a latest slot that one or more CORESETs are configured at the UE.

17. The method of claim 15, wherein at least one antenna port of demodulation-reference signal (DM-RS) port group of the downlink data channel is QCL'ed with an RS set included in a set of QCL parameters provided by the TCI state, and wherein, when the downlink data channel is scheduled by a DCI format 1_0, the TCI state for the downlink data channel is identical to a TCI state configured to a CORESET of downlink control channel scheduling the downlink data channel.

* * * * *